United States Patent
Balavoine et al.

(10) Patent No.: US 6,403,705 B1
(45) Date of Patent: Jun. 11, 2002

(54) MOLECULAR ROD AND USES

(75) Inventors: Fabrice Balavoine, Paris; Charles Mioskowski, Strasbourg; Patrick Schultz, Fegersheim, all of (FR)

(73) Assignees: Commissariat a L'Energie Atomique; Centre National de la Recherche Scientifique-CNRS, both of Paris (FR)

( * ) Notice: Subject to any disclaimer, the term of this patent is extended or adjusted under 35 U.S.C. 154(b) by 0 days.

(21) Appl. No.: 09/701,192
(22) PCT Filed: May 21, 1999
(86) PCT No.: PCT/FR99/01207

§ 371 (c)(1),
(2), (4) Date: Feb. 6, 2001

(87) PCT Pub. No.: WO99/61912

PCT Pub. Date: Dec. 2, 1999

(30) Foreign Application Priority Data

May 25, 1998 (FR) ............................................. 98/06540

(51) Int. Cl.⁷ .......................... C08G 63/48; C08K 5/07; C12Q 1/68
(52) U.S. Cl. ............................ 525/50; 435/6; 435/7.1; 435/7.2; 526/76; 526/72; 525/160; 525/141; 525/119; 525/95; 525/89; 525/73; 525/7
(58) Field of Search ............................ 435/6, 7.1, 7.2; 526/76, 72; 525/160, 141, 119, 95, 89, 73, 7, 50

(56) References Cited

PUBLICATIONS

Wallow et al. "In aqua synthesis of water–soluble (poly(p–phenylene) derivatives" J.Am.Chem.Soc. vol. 113, pp. 7411–7412, 1991.*

* cited by examiner

*Primary Examiner*—Jezia Riley
(74) *Attorney, Agent, or Firm*—Oblon, Spivak, McClelland, Maier & Neustadt, P.C.

(57) ABSTRACT

The invention concerns molecular rods, their uses in a method for fixing and/or crystallising macromolecules, the resulting products and uses of said products in the field of materials and structural biology, in particular as biosensors or as biomaterials. Said molecular rods have a structure represented by the general formula (I) and said method essentially consists in incubating, for at least 15 minutes, a biological macromolecule in solution with a molecular rod as defined by the formula, in suitable temperature and pH conditions.

30 Claims, 3 Drawing Sheets

MOLECULAR ROD AND USES

This application is a National Stage Application under 35 U.S.C. §371 of PCT/FR99/01207 filed May 21, 1999. This application claims priority under 35 U.S.C. §119 to France 98/06540 filed May 25, 1998, the entire contents of which are herein incorporated by reference.

The present invention relates to molecular rods, to their uses in a method of attaching and/or crystallizing macromolecules, to the resulting products and to the applications of said products in the field of materials and structural biology, especially as biosensors or biomaterials.

Knowledge of the structure of proteins and especially their active sites is essential to an understanding of their mechanism of action. Several methods are available for conducting such studies: X-rays, NMR and electrocrystallography (2D crystallization).

To perform the actual crystallization, the technique of two-dimensional crystallization on a lipid monolayer or film at the air/water interface (E. E. Ugziris et al., Nature, 1983, 301, 125–129) makes it possible to form auto-organized systems of biological macromolecules (crystals) and determine the structures of these molecules by electron microscopic analysis of the crystals obtained.

This method consists in creating a lipid monolayer at an air/liquid interface, the lipids being selected to interact with the proteins, present in the liquid phase, which attach themselves to the lipids and then form an organized network.

Attachment of the proteins to the lipids of the monolayer involves chemical interactions at the polar head of the lipids. These interactions are either nonspecific—in which case the lipids possess charged polar ends giving rise to crystallization by ionic interactions—or specific. In the latter case, the polar head of the lipids carries ligands with a strong affinity for the proteins to be attached.

In particular, it has been possible to show that soluble proteins can crystallize two-dimensionally on charged lipid films or lipid films functionalized by a ligand of the protein studied (B. J. Jap et al., Ultramicroscopy, 1992, 46, 45–84).

More recently, lipids functionalized by metal complexes such as nickel complexes (E. W. Kubalek et al., J. Struct. Biol., 1994, 113, 117–123) have made it possible to crystallize so-called histidine-tagged fusion proteins. These proteins in fact possess a sequence composed of several histidines at their N-terminal or C-terminal end. It has been possible to show that the attachment of such proteins to a nickel-functionalized lipid is due to a strong interaction between the nickel complex and the polyhistidine sequence (C. Vénien-Brian et al., J. Mol. Biol., 1997, 274, 687–692). Such functionalized lipids have enabled crystallization to be achieved, especially in cases where the appropriate ligand was not available.

However, the crystallization of proteins on lipid films has the disadvantage of being relatively random and of being dependent on numerous factors which cannot easily be controlled simultaneously:

The ligand carried by the lipids must be sufficiently accessible to be able to interact with the proteins. This accessibility depends on the length of the spacer arm between the lipid and the ligand: if it is too short, it allows the protein to penetrate inside the lipid layer; if it is too long, it gives the bound protein too great a degree of freedom and increases the incidence of defects in the crystal.

The lipid monolayer must be sufficiently fluid to give the bound protein a sufficient lateral and rotational mobility, thereby enabling the proteins to organize themselves relative to one another and develop intermolecular contacts so as to produce the crystal.

Another difficulty inherent in crystallization on a lipid monolayer concerns the stability of the monolayer; in fact, the stability of the air/liquid interface is difficult to control. In addition, the lipid monolayer must remain stable, not only before but also after attachment of the proteins, in order to allow spatial organization of the proteins.

For the microscopic study, which follows the crystallization step, it is necessary to create a large number of planes because of the planar nature of the structure obtained.

Consequently, the Inventors set out to provide structures, hereafter called molecular rods, which were suitable for attaching and crystallizing biological macromolecules in solution, as well as a method of attaching said biological macromolecules in solution and optionally of inducing their auto-organization, said method satisfying the practical needs better than the 2D crystallization methods used in the prior art.

The present invention relates to molecular rods, characterized in that they have a structure represented by the following general formula I:

in which:

P is a polymer selected from the group comprising polyphenylenes, polyphenylenevinylenes, polyphenyleneethynylenes and polyvinylenes, as illustrated by the formulae below:

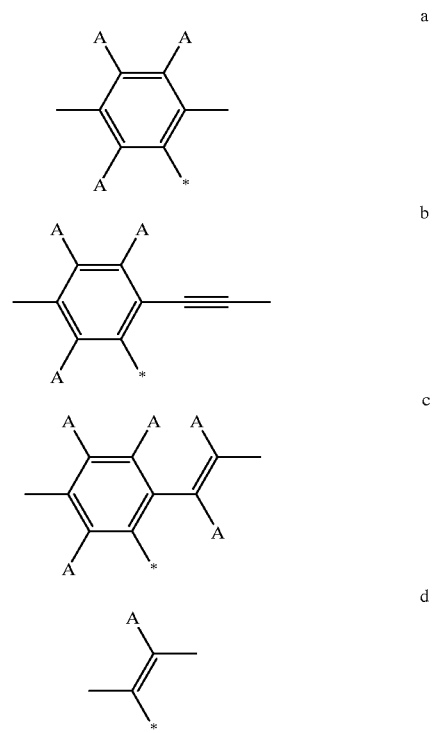

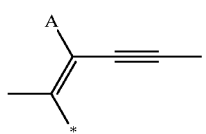

e

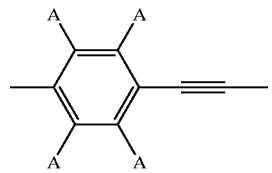

in which:
A is a hydrogen atom or one of the following groups: alkyl, OH, O-alkyl, $NH_2$, NH-alkyl, $CO_2H$, $CO_2$-alkyl, $CONH_2$, CONH-alkyl;

GpF (functional group) is a group B—R, in which:
B (bonding arm) is selected from $C_1$–$C_{10}$ hydrocarbon groupings which are optionally substituted by alkyl groups, may or may not have units of unsaturation or polyoxyethylene units and may or may not have phosphate groups in the middle of the chain, such as:

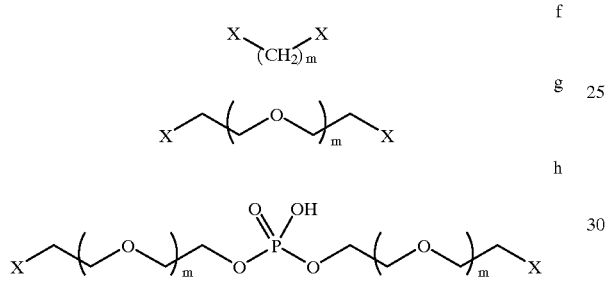

f g h in which:
m is an integer from 1 to 10, and
X is O, NHCO, OCO, COO, CONH, S, $CH_2$ or NH and constitutes, at the ends of said hydrocarbon groupings, organic coupling groups of the ester, amide, ether or thioether type; and
R is a hydrophilic group selected from positively or negatively charged groups; ligands or analogues of biological macromolecules such as, without implying a limitation, biotin, novobiocin, retinoic acid, steroids or antigens; or organometallic complexes interacting with amino acids or nucleic acids, such as complexes of copper, zinc, nickel, cobalt, chromium, platinum, palladium, iron, ruthenium or osmium with ligands like IDA, NTA, EDTA, bipyridine or terpyridine, said ligands optionally being functionalized by alkyl groups for bonding to E (at X); without implying a limitation, positively or negatively charged groups are understood as meaning ammonium, carboxylate, phosphate or sulfonate groups; the following groups may be mentioned as examples: —$N(CH_3)_3^+$ or —$CO_2^-$;
n is an integer between 5 and 1000;
p is an integer between 0 and 10; and
E (spacer segment) is a chemical unit whose nature does not disturb the rigid structure of the skeleton formed by P, and is a phenylene, ethynylene or vinylene unit or a combination of these units, such as phenyleneethynylene, as illustrated by the formula below:

in which A is a hydrogen atom or one of the following groups: alkyl, OH, O-alkyl, $NH_2$, NH-alkyl, $CO_2H$, $CO_2$-alkyl, $CONH_2$, CONH-alkyl.

Together with GpF and E, the different polymers P as defined above give the following formulae:

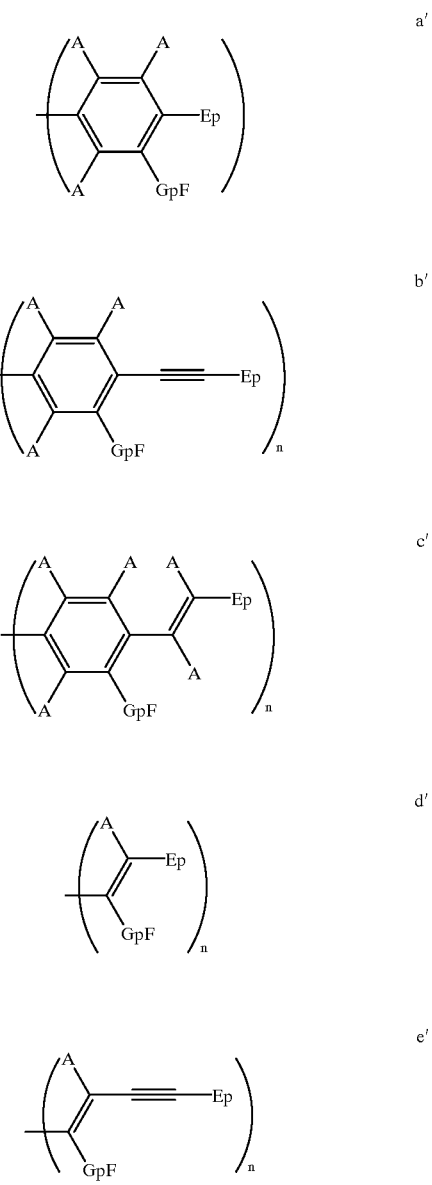

In terms of the present invention, alkyl is understood as meaning linear or branched or optionally substituted $C_1$–$C_6$ alkyl groups.

The substituents of the $C_1$–$C_{10}$ hydrocarbon groupings B are selected particularly from $C_1$–$C_6$ alkyls.

Polymers whose skeleton has a large number of units of conjugation (polyphenylene, polyphenylenevinylene, polyphenyleneethynylene) have already been described (Angew. Chem. Int. Ed., 1998, vol. 37, pp. 402–428) and are used for their electronic and fluorescent properties in non-linear optics (Macromolecules, 1994, 27, 562–571 and J. Phys. Chem., 1995, 99, 4886–4893).

The polymers according to the present invention are functionalized by groups GpF which, in association with the moiety E, give the molecular rod according to the invention particular properties:

- it is linear, rigid and soluble in aqueous media;
- it is regularly functionalized by groups with a very strong affinity for biological macromolecules; and
- when dissolved with a biological macromolecule, it is particularly suitable for the attachment and/or auto-organization of said macromolecules to/on said rod by molecular recognition.

The structure of the molecular rods according to the invention is illustrated in FIG. 1:

P constitutes a polymer skeleton, which must be rigid and linear overall so as to have the character of a molecular rod; and E makes it possible to control the distance L2 between the functional groups GpF, while the bonding arm B of GpF makes it possible to control the distance L1 between the group R and the axis of the polymer, as illustrated in FIG. 2.

In one advantageous embodiment of said molecular rods, they have the following general formula II:

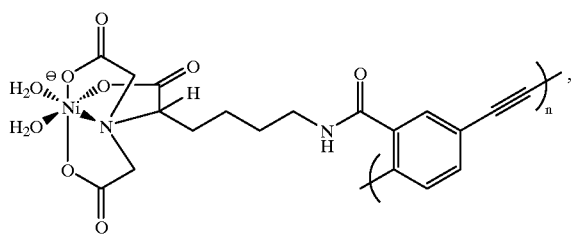

II in which:

p=0: absence of E;

P is the group b as defined above;

GpF comprises a group B represented by a group $f$ as defined above in which m=3, one of the groups X is NHCO and the other is $CH_2$, and a group R represented by a nickel-based organometallic complex (Ni—NTA complex); and n is an integer between 5 and 1000.

In another advantageous embodiment of said molecular rods, they have the following general formula III:

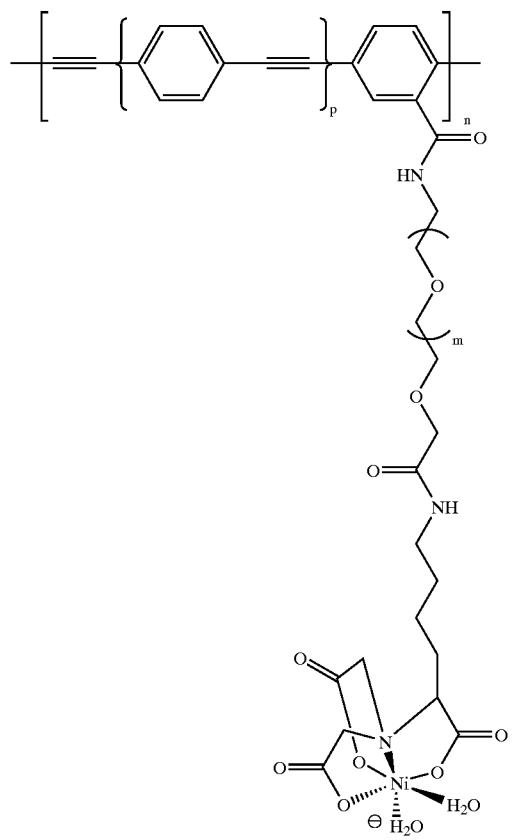

III in which:

m is an integer between 1 and 10;

p is an integer between 0 and 10;

P is the group b as defined above;

GpF comprises a group B represented by a group h as defined above in which the two groups X are identical and are NHCO, associated with a group R represented by a nickel-based organometallic complex (Ni—NTA complex) in which the ligand NTA is functionalized by a $C_4$ alkyl group=$(CH_2)_4$; and n is an integer between 5 and 1000.

The present invention further relates to a method for the attachment and/or auto-organization of biological macromolecules, characterized in that it comprises essentially the incubation of a biological macromolecule in solution with a molecular rod, as defined above, for at least 15 minutes under suitable temperature and pH conditions.

After attachment and/or auto-organization of the macromolecules, a supramolecular object is obtained.

In the auto-organization process according to the invention, the supramolecular object obtained will optionally be able to develop into a spiral crystal of biological macromolecules around the molecular rod.

Said method is particularly suitable for controlling the spiral crystallization of the biological macromolecules around said molecular rods.-

Surprisingly, the molecular rods according to the invention which make it possible to attach biological macromolecules in solution and optionally to induce their auto-organization offer important applications in the fields of nanomaterials or structural biology:

attachment of biological macromolecules to the molecular rods, with or without control of the orientation of this attachment;

control of the spiral crystallization of the biological macromolecules around the molecular rods; and structural study of the biological macromolecules by electron microscopic analysis of the spiral crystals obtained.

In one advantageous mode of carrying out said method, said biological macromolecules are especially soluble membrane or trans-membrane proteins, enzymes, antibodies, antibody fragments or nucleic acids.

In another mode of carrying out said method, said solution consists of an aqueous or aqueous-alcoholic solvent for solubilizing said biological macromolecules, optionally containing at least one detergent, depending on the biological macromolecule to be crystallized.

In another advantageous mode of carrying out said method, the incubation conditions are preferably as follows: incubation at room temperature for 15 minutes to 48 hours at a pH of between 5.5 and 8.5.

The method according to the present invention is particularly applicable to determination of the three-dimensional structure of soluble proteins.

The formation of a spiral crystal of a biological macromolecule, such as a protein, on a molecular rod is the result of a perfect match between the dimensions of the macromolecule (diameter) and the parameters of the rod (distances L1 and L2 and length of the molecular rod). The distance L1 represents the distance between the group R and the axis of the polymer. The distance L2 represents the distance between two groups R. The length of the molecular rod is equivalent to the degree of polymerization of the polymer (cf. FIG. 2).

Surprisingly, said method makes it possible to obtain arrangements of biological macromolecules which allow structural studies by electron microscopy or the preparation of novel nanomaterials useful for their physical, electrical or biological properties.

The present invention consequently includes the preparation of a library of molecular rods in which the distances L1 and L2 are variable.

The present invention further relates to a supramolecular object, characterized in that it consists of a molecular rod, as defined above, to which biological macromolecules are attached in a non-covalent manner or on which they are organized in a crystalline form.

The present invention further relates to the applications of said supramolecular object, and to the structural study of the macromolecules associated therewith, as a biological reagent and especially as an immunological reagent and as a biosensor or bioconductor.

Apart from the foregoing provisions, the invention also comprises other provisions which will become apparent from the following description referring to Examples of how to carry out the method forming the subject of the present invention, and to the attached drawings, in which.

Figure 1:
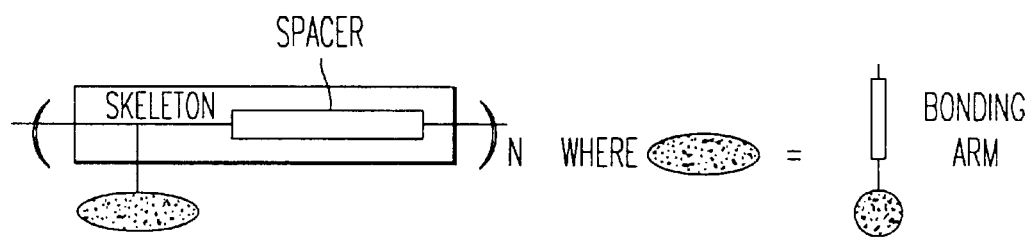
FIG. 1 is a descriptive diagram of an element of a molecular rod according to the invention.
Figure 2:
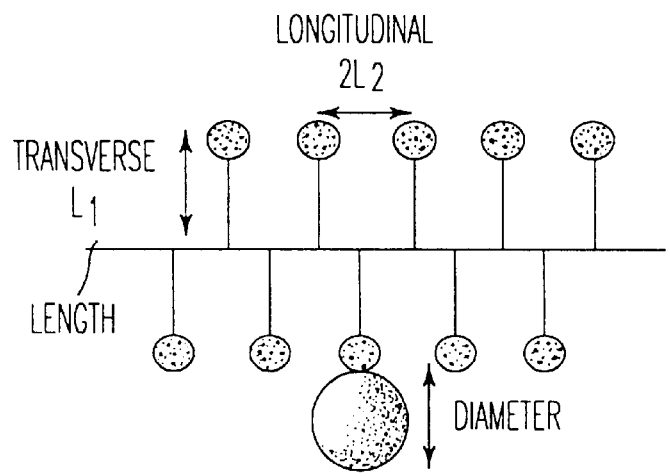
FIG. 2 illustrates a molecular rod according to the invention.
Figure 3:
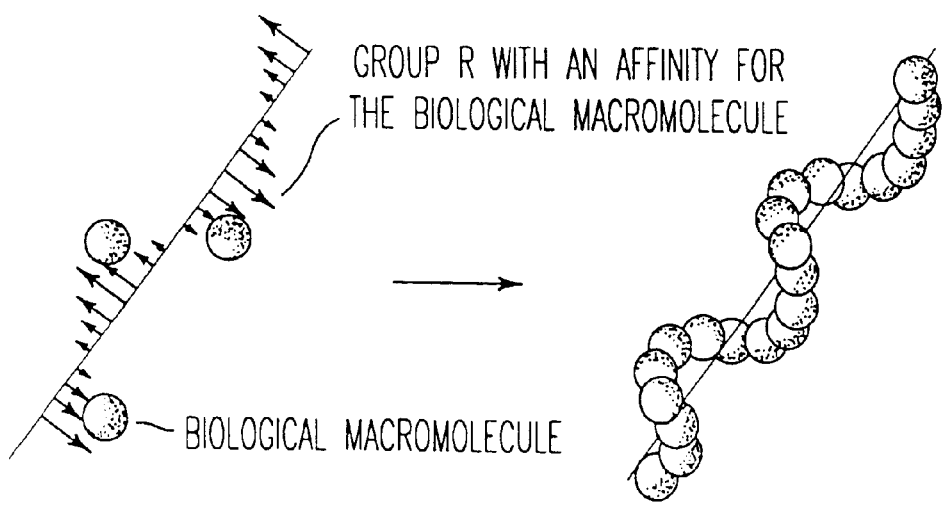
FIG. 3 is a descriptive diagram showing the formation of a spiral crystal of biological macromolecules on a molecular rod.
Figure 4:
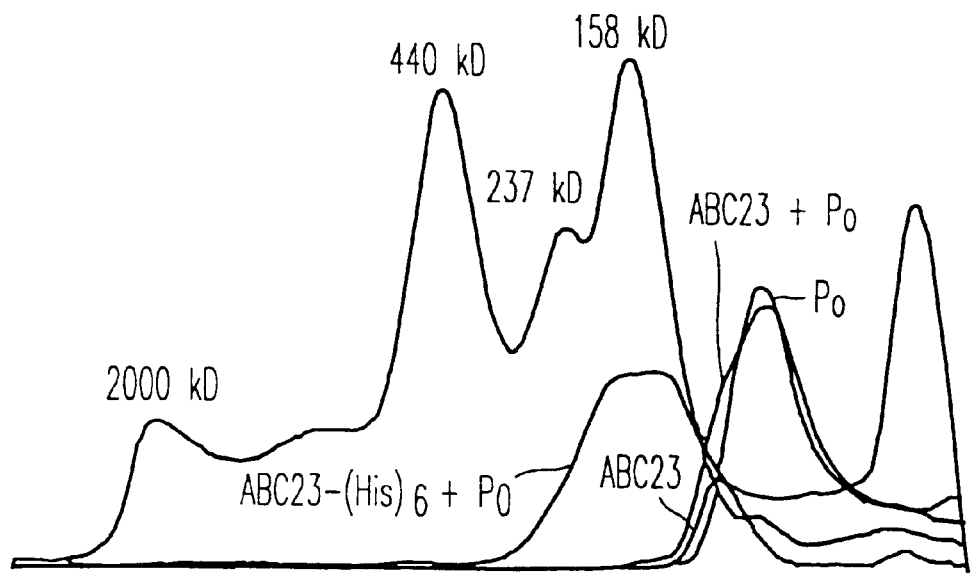
FIG. 4 illustrates the study of the attachment of the ABC23-(His)$_6$ of yeast RNA polymerase to a molecular rod according to the invention by permeation chromatography on a Superose® 6 column using a Tris buffer (10 mM, pH 8; 150 mM NaCl) as the eluent (Smart® system)
Figure 5:
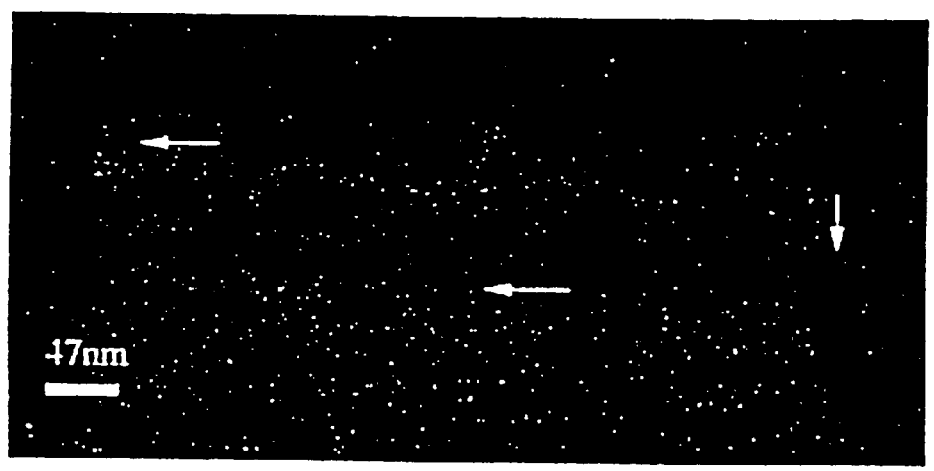
FIG. 5 is a photograph of a molecular rod according to the invention.

It must be clearly understood, however, that these Examples are given solely in order to illustrate the subject of the invention without in any way implying a limitation.

EXAMPLE 1

Preparation of a Biotinylated Molecular Rod for the Attachment of Streptavidine

A polyphenyleneethynylene polymer functionalized by biotins was prepared for the purpose of attaching and crystallizing streptavidine or a fusion streptavidine:

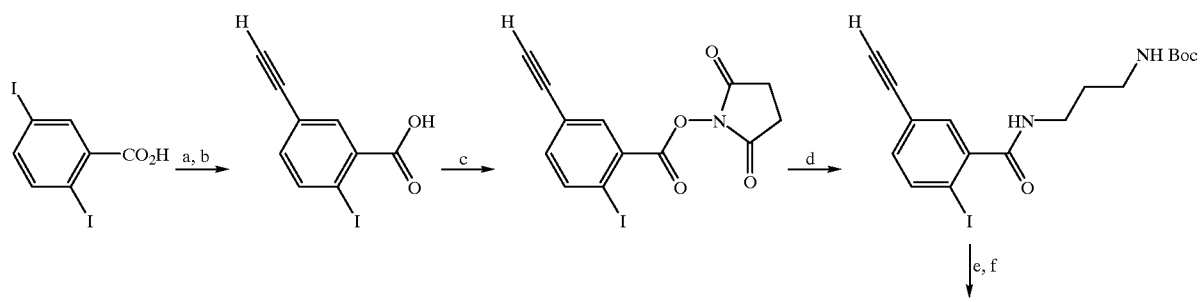

-continued

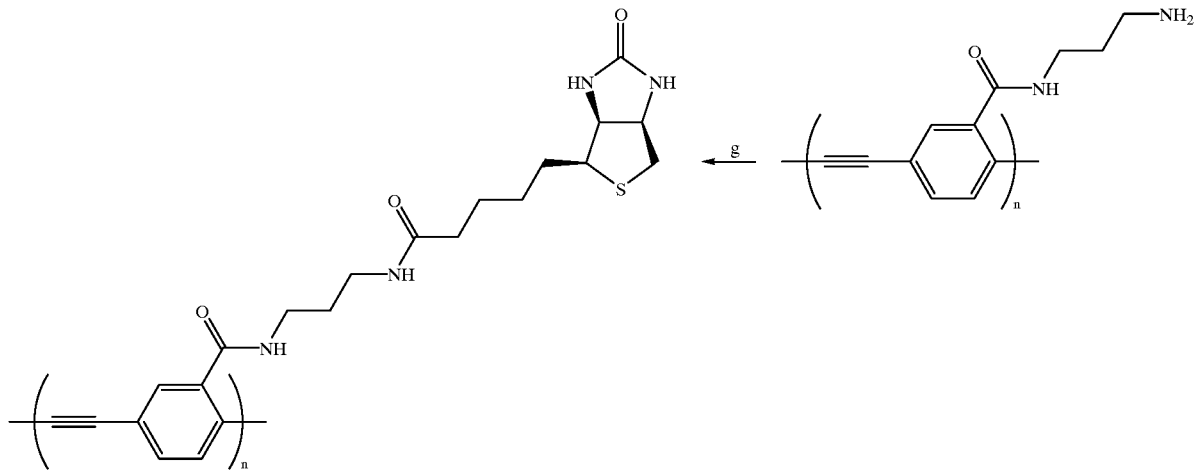

Conditions:

a. TMSA, PdCl$_2$(PPh$_3$)$_2$, CuI, THF/TEA; b. KOH, MeOH; c. NHS, DCC, THF; d. H$_2$N—(CH$_2$)$_3$—NHBoc, CH$_2$Cl$_2$, TEA; e. PdCl$_2$(PPh$_3$)$_2$, CuI, THF/TEA; f. TFA, CH$_2$Cl$_2$; g. biotin-NHS, DME, TEA.

Experimental Protocols t-Butyl (3-aminopropyl)carbamate

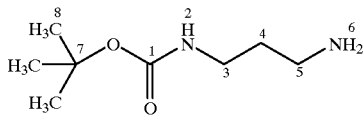

PROCEDURE

A solution of 2.6 g of t-butyl dicarbonate (11.9 mmol, 0.1 eq.) in 10 ml of MeOH is added dropwise at 0° C. to a solution of 10 ml of propanediamine (120 mmol, 1 eq.) in 40 ml of MeOH. Stirring is maintained at room temperature for 15 h and the reaction medium is then evaporated. The residue is taken up in 20 ml of water and 50 ml of CH$_2$Cl$_2$ and the organic phase is dried over MgSO$_4$, filtered and then evaporated to give 1.8 g of a colourless oil (yield: 87%/Boc$_2$O), which is used in the subsequent steps without further purification.

Empirical formula: C$_8$H$_{18}$O$_2$N$_2$ MW: 174 g/mol TLC: Rf(CH$_2$Cl$_2$/MeOH/TEA: 69/30/1): 0.26; $^1$H NMR (300 MHz, CDCl$_3$): δ 4.92 (bs, 1H, H$_2$); 3.16 (tt, J$_{3-4}$=6.6 Hz, J$_{3-2}$=7.2 Hz, 2H, H$_3$); 2.73 (t, J$_{5-4}$=6.6 Hz, 2H, H$_5$); 1.57 (tt, J$_{4-3\ and\ 4-5}$=6.6 Hz, 2H, H$_4$; 1.41 (s, 9H, H$_8$); 1.17 (bs, 2H, H$_6$); $^{13}$C NMR (75.47 MHz, CDCl$_3$): δ 155.88 (1C, C$_1$); 78.73 (1C, C$_7$); 39.42 (1C, C$_5$); 38.15 (1C, C$_3$); 33.16 (1C, C$_4$); 28.15 (3C, C$_8$); MS (70 eV/DCI/NH$_3$/intensity %): m/e: 175 (100, [M+1]$^+$); 192 (10, [M+18]$^+$).

t-Butyl [3-(5-ethynyl-2-iodobenzoylamino)propyl] carbamate

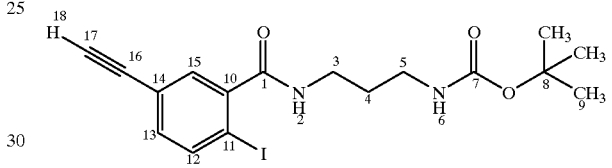

PROCEDURE

A solution of 174 mg of t-butyl (3-aminopropyl) carbamate (1 mmol, 1 eq.) in 7 ml of CH$_2$Cl$_2$ and 0.5 ml of trimethylamine is added to a solution of 369 mg of 2,5-dioxopyrrolidin-1-yl 2-iodo-5-ethynylbenzoate (1 mmol, 1 eq.) in 7 ml of CH$_2$Cl$_2$. The reaction medium is stirred at room temperature for 48 h and then evaporated. The residue obtained is purified by chromatography on silica gel 60H (hexane/EtOAc: 1/1) to give 416 mg of a white solid with a yield of 97%.

Empirical formula:. C$_{17}$H$_{21}$O$_3$N$_2$ MW: 428 g/mol TLC: Rf(hexane/EtOAc: 1/1): 0.40; $^1$H NMR (300 MHz, CDCl$_3$): δ 7.80 (d, J$_{12-13}$=8.2 Hz, 1H, H$_{12}$); 7.46 (d, J$_{15-13}$=2.0 Hz, 1H, H$_{15}$); 7.17 (dd, J$_{13-12}$=8.2 Hz, J$_{13-15}$=2.0 Hz, 1H, H$_{13}$) 6.55 (bs, 1H, H$_2$); 4.92 (bs, 1H, H$_6$); 3.48 (tt, J$_{3-4}$=6.2 Hz, J$_{3-2}$=6.0 Hz, 2H, H$_3$); 3.27 (tt, J$_{5-4}$=5.7 Hz, J$_{5-6}$=6.4 Hz, 2H, H$_5$); 1.70–1.78 (m, 2H, H$_4$); 1.41 (s, 9H, H$_8$); $^{13}$C NMR (75.47 MHz, CDCl$_3$): δ 166.70 (1C, C$_1$); 156.44 (1C, C$_7$); 142.38 (1C, C$_{10}$); 139.63, 133.74 (2C, C$_{12}$, C$_{13}$); 131.05 (1C, C$_{15}$); 122.22 (1C, C$_{14}$); 92.81 (1C, C$_{11}$); 81.62 (1C, C$_{16}$); 79.26, 79.17 (2C, C$_{17}$, C$_7$); 37.07, 36.42 (2C, C$_5$, C$_3$); 29.83 (1C, C$_4$); 28.14 (3C, C$_8$); MS (70 eV/DCI/NH$_3$/intensity %): m/e: 429 (26, [M+1]$^+$); 446 (100, [M+18]$^+$).

Polymerization of T-butyl [3-(5-ethynyl-2-iodobenzoylamino)propyl]-carbamate

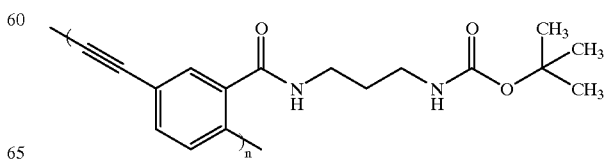

PROCEDURE 350 mg of t-butyl [3-(5-ethynyl-2-iodobenzoylamino)propyl]carbamate (0.81 mmol, 1 eq.) are placed in a mixture consisting of 24.5 ml of THF and 24.5 ml of triethylamine, and 57 mg of dichlorobistriphenylphosphinepalladium (0.081 mmol, 0.1 eq.) and 57 mg of copper iodide (0.28 mmol, 0.3 eq.) are then added. The reaction medium is heated at 50° C. for 15 h. After returning to room temperature, the reaction medium is poured into 900 ml of acetone. 160 mg of polymer are recovered in the form of a yellow solid by centrifugation of the acetone.

Hydrolysis of the Polymer

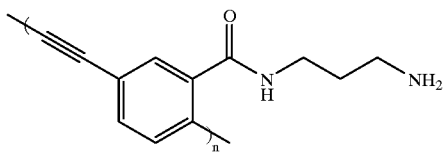

PROCEDURE 50 mg of polymer are suspended in 1 ml of $CH_2Cl_2$, 0.5 ml of trifluoroacetic acid is subsequently added dropwise at 0° C. and the reaction medium then becomes soluble. After stirring for 2 h, the reaction medium is evaporated and then resuspended in a mixture consisting of 1 ml of $CH_2Cl_2$ and 1 ml of triethylamine. The precipitate is recovered by centrifugation, washed several times with water and then lyophilized.

UV (0.1 N HCl, 0.208 mg/ml): 348 (5856); 321 (5317); 301 (3990); 283 (3317); 201 (8519);

Coupling of Biotin

PROCEDURE 15 mg of polymer and 15 mg of biotin-N-hydroxysuccinimide are suspended in 10 ml of DMF. After stirring for 48 h, the reaction medium is filtered, evaporated and then resuspended in $CH_2Cl_2$. The precipitate is recovered by centrifugation, washed several times with ethyl acetate and then lyophilized.

EXAMPLE 2

Preparation of a Molecular Rod Functionalized by an Ni—NTA Complex

A polymer of the polyphenyleneethynylene type functionalized by nickel-NTA complexes was prepared for the purpose of attaching and crystallizing biological macromolecules carrying a polyhistidine tag. The method of preparing NTA*, the analogue of NTA, is identical to that described by C. Vénien-Brian et al. (J. Mol. Biol., 1997, vol. 274, pp. 687–692).

Synthesis Scheme

Preparation of the Polymer P0

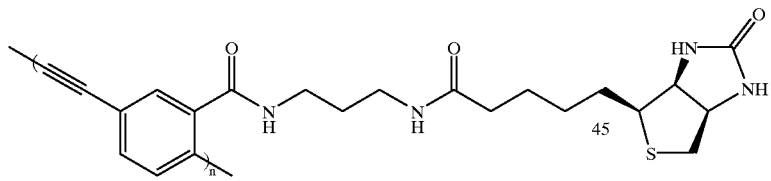

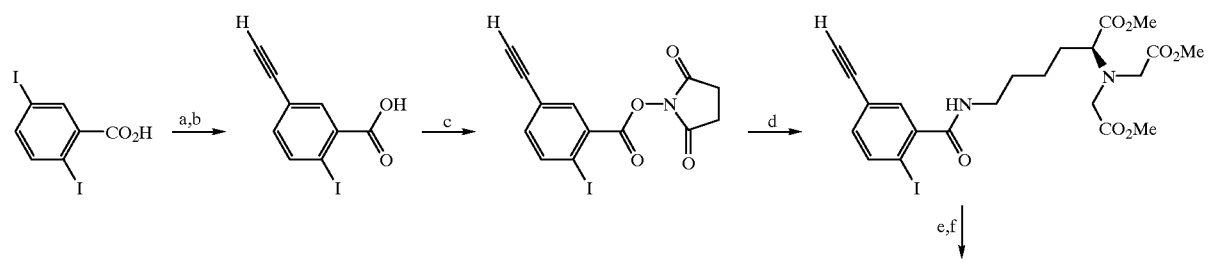

-continued

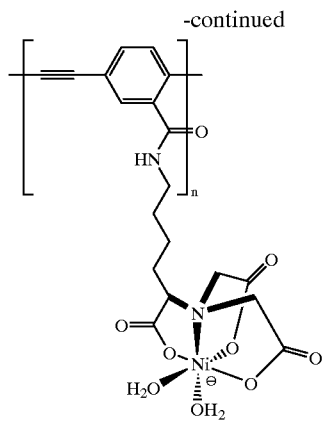

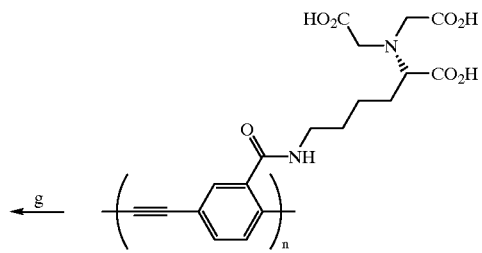

Conditions:

a. TMSA, PdCl$_2$(PPh$_3$)$_2$, CuI, THF/TEA; b. KOH, MeOH; c. NHS, DCC, THF; d. NTA*, CH$_2$Cl$_2$, TEA; e. PdCl$_2$(PPh$_3$)$_2$, CuI, THF/TEA; f. KOH, MeOH; g. NiCl$_2$.6H$_2$O, Tris (10 mM, pH 8).

Experimental Protocols

2-Iodo-5-trimethylsilylethynylbenzoic acid

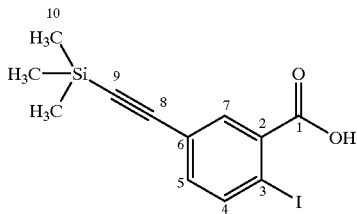

PROCEDURE 1.12 g of 2,5-diiodobenzoic acid (3 mmol, 1 eq.), 210 mg of dichlorobis-triphenylphosphinepalladium(II) (0.3 mmol, 0.1 eq.) and 200 mg of copper(I) iodide (1 mmol, 0.34 eq.) are dissolved in 60 ml of a THF/TEA mixture (3/1). After the addition of 425 μl of trimethylsilylacetylene (3 mmol, 1 eq.), stirring is continued at room temperature for 16 hours in the dark. The reaction medium is then evaporated to dryness and the residue obtained is purified by flash chromatography on silica 60H (hexane/EtOAc/AcOH: 70/30/1%) to give 754 mg of 2-iodo-5-trimethylsilylethynylbenzoic acid in the form of fine yellow needles after drying under vacuum (yield: 73%).

Empirical formula: C$_{12}$H$_{13}$IO$_2$Si MW: 344.221 g/mol TLC: Rf (hexane/EtOAc/AcOH: 50/50/1%): 0.55; $^1$H NMR (300 MHz, acetone-d$_6$): δ 10.93 (broad s, 1H, H$^1$); 8.02 (d, $J_{4-5}$=8.2 Hz, 1H, H$_4$); 7.92 (d, $J_{5-7}$=1.8 Hz, 1H, H$_7$); 7.27 (dd, $J_{4-5}$=8.2 Hz, $J_{5-7}$=1.8 Hz, 1H, H$_5$); 0.25 (s, 9H, H$_{10}$); $^{13}$C NMR (75.47 MHz, acetone-d$_6$): δ 166.99 (1C, C$_1$); 142.24 (1C, C$_4$); 136.85 (1C, C$_2$); 135.57 (1C, C$_5$); 134.16 (1C, C$_7$); 123.75 (1C, C$_6$); 103.59 (1C, C$_3$); 97.12 (1C, C$_8$); 94.52 (1C, C$_9$); −0.28 (3C, C$_{10}$); MS (70 eV/DCI/NH$_3$/intensity %): m/e: 362 (100, [M+18]$^+$).

2-Iodo-5-ethynylbenzoic acid

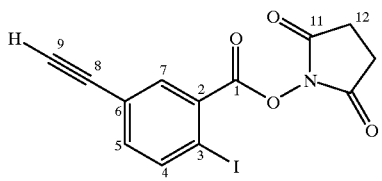

PROCEDURE 4.5 ml of aqueous potassium hydroxide solution (1 N) are added at 0° C. to a solution of 500 mg of 2-iodo-5-trimethylsilylethynylbenzoic acid (1.45 mmol, 1 eq.) in 30 ml of methanol. After stirring for 2 h at room temperature, the reaction medium is washed with 2×50 ml of CH$_2$Cl$_2$ and the aqueous phase is then reacidified to pH 2 by the addition of molar hydrochloric acid solution. After extraction with 2×50 ml of CH$_2$Cl$_2$, the organic phases are combined, dried and evaporated to give 383 mg of 2-iodo-5-ethynylbenzoic acid in the form of a yellow solid (yield: 97%).

Empirical formula: C$_9$H$_5$IO$_2$ MW: 272.039 g/mol TLC: Rf (hexane/EtOAc/AcOH: 50/50/1%): 0.4; $^1$H NMR (300 MHz, acetone-d$_6$): δ 8.08 (d, $J_{4-5}$=8.1 Hz, 1H, H$_4$); 7.93 (d, $J_{5-7}$=1.9 Hz, 1H, H$_7$); 7.36 (dd, $J_{4-5}$=8.1 Hz, $J_{5-7}$=1.9 Hz, 1H, H$_5$); 3.87 (s, 1H, H$_9$); $^{13}$C NMR (75.47 MHz, acetone-d$_6$): δ 167.01 (1C, C$_1$); 142.22 (1C, C$_4$); 137.32 (1C, C$_2$); 135.72 (1C, C$_5$); 134.12 (1C, C$_7$); 123.00 (1C, C$_6$); 94.51 (1C, C$_3$); 82.08 (1C, C$_8$); 81.22 (1C, C$_9$); MS (70 eV/DCI/NH$_3$/intensity %): m/e: 290 (100, [M+18]$^+$); 307 (66, [M+35]$^+$). 562 (8, [2M+18]$^+$);

2,5-Dioxopyrrolidin-1-yl 2-iodo-5-ethynylbenzoate

PROCEDURE

A solution of 495 mg (2.4 mmol, 1.2 eq.) of DCC in 20 ml of THF is added at 0° C. to a solution of 544 mg (2 mmol, 1 eq.) of 2-iodo-5-ethynylbenzoic acid and 276 mg of NHS (2.4 mmol, 1.2 eq.) in 30 ml of THF. The mixture is stirred overnight at room temperature. The reaction medium is subsequently filtered and then evaporated and the residue obtained is purified by flash chromatography on silica 60H (hexane/EtOAc: 70/30) to give 568 mg of 2,5-dioxopyrrolidin-1-yl 2-iodo-5-ethynylbenzoate in the form of a yellow solid after drying under vacuum (yield: 77%).

Empirical formula: $C_{13}H_8INO_4$ MW: 369.114 g/mol TLC: Rf (hexane/EtOAc: 50/50): 0.46; $^1H$ NMR (300 MHz, $CDCl_3$): δ 8.18 (d, $J_{5-7}$=2.4 Hz, 1H, $H_7$); 8.3 (d, $J_{4-5}$=8.5 Hz, 1H, $H_4$); 7.34 (dd, $J_{4-5}$=8.5 Hz, $J_{5-7}$=2.4 Hz, 1H, $H_5$); 3.22 (s, 1H, $H_9$); 2.91 (s, 4H, $H_{11}$); $^{13}C$ NMR (75.47 MHz, $CDCl_3$): δ 168.53 (2C, $C_{11}$); 160.49 (1C, $C_1$); 141.92 (1C, $C_4$); 136.97 (1C, $C_5$); 135.09 (1C, $C_7$); 129.67 (1C, $C_2$); 122.60 (1C, $C_6$); 95.60 (1C, $C_3$); 80.81 (1C, $C_8$); 80.20 (1C, $C_9$); 25.46 (2C, $C_{12}$); MS (70 eV/DCI/$NH_3$/intensity %): m/e: 387 (100, $[M+18]^+$); 404 (27, $[M+35]^+$).

Methyl 2-(Bismethoxycarbonylmethylamino)-6-(2-iodo-5-ethynyl-benzoylamino)hexanoate

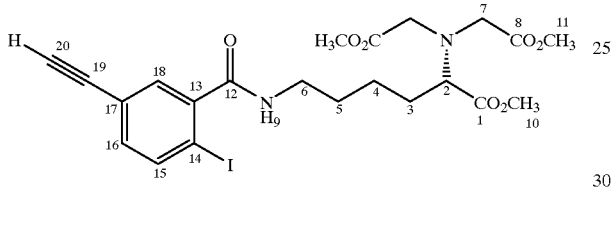

PROCEDURE

A solution of 1 ml of TEA and 370 mg (1 mmol, 1 eq.) of 2,5-dioxopyrrolidin-1-yl 2-iodo-5-ethynylbenzoate in 20 ml of $CH_2Cl_2$ is added to a solution of 320 mg (1.05 mmol, 1.05 eq.) of NTA* in 20 ml of $CH_2Cl_2$. The mixture is stirred for 16 hours at room temperature. The reaction medium is then evaporated and chromatographed on silica ($CH_2Cl_2$/MeOH/TEA: 90/10/1) to give 380 mg of methyl 2-(bismethoxycarbonylmethylamino)-6-(2-iodo-5-ethynyl-benzoylamino)hexanoate in the form of an orange oil (yield: 68%).

Empirical formula: $C_{22}H_{27}IN_2O_7$ MW: 558.372 g/mol TLC: Rf (hexane/EtOAc: 50/50): $^1H$ NMR (300 MHz, $CDCl_3$): δ 7.74 (d, $J_{15-16}$=8.2 Hz, 1H, $H_{15}$); 7.41 (d, $J_{16-18}$=2.1 Hz, 1H, $H_{18}$); 7.09 (dd, $J_{15-16}$=8.2 Hz, $J_{16-18}$=2.1 Hz, 1H, $H_{16}$); 6.46 (t, $J_{6-9}$=5.1 Hz, 1H, $H_9$); 3.62 and 3.56 (s, 13H, $H_{10}$, $H_{11}$, $H_7$); 3.38 (t, $J_{2-3}$=7.3 Hz, 1H, $H_2$); 3.36 (t, $J_{5-6}$=6.6 Hz, $J_{6-9}$=5.1 Hz, 2H, $H_6$); 1.40–1.80 (m, 6H, $H_3$, $H_4$, $H_5$); $^{13}C$ NMR (75.47 MHz, $CDCl_3$): δ 172.82 (1C, $C_1$); 171.54 (2C, $C_8$); 168.42 (1C, $C_{12}$); 142.57 (1C, $C_{13}$); 139.49 (1C, $C_{15}$); 133.54 (1C, $C_{16}$); 131.17 (1C, $C_{18}$); 122 (1C, $C_{17}$); 93.04 (1C, $C_{14}$); 81.69 (1C, $C_{19}$); 79.19 (1C, $C_{20}$); 63.95 (1C, $C_2$); 52.25 (2C, $C_7$); 51.41 and 51.22 (3C, $C_{10}$, $C_{11}$); 39.53 (1C, $C_6$); 29.37 (1C, $C_3$); 28.08 (1C, $C_5$); 22.71 (1C, $C_4$); MS (70 eV/DCI/$NH_3$/intensity %): m/e: 631 (9, $[M+1]^+$); 648 (100, $[M+18]_+$). Microanalysis for $C_{22}H_{27}IN_2O_7$: Calc.: C, 47.32; H, 4.87; N, 5.02; O, 20.06; I, 22.73 Exp.: C, 47.01; H, 4.95; N, 4.87.

Polymerization of Methyl 2-(Bismethoxycarbonylmethylamino)-6-(2-iodo-5-ethynylbenzoylamino)hexanoate

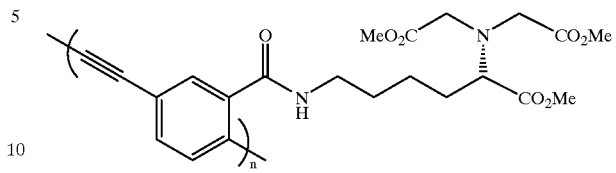

PROCEDURE 84 mg of methyl 2-bismethoxycarbonylmethylamino)-6-(2-iodo-5-ethynyl-benzoylamino)hexanoate (0.15 mmol, 1 eq.) are placed in a mixture consisting of 6 ml of THF and 2 ml of triethylamine, and 11 mg of dichlorobistriphenylphosphinepalladium (17 μmol, 0.1 eq.) and 15 mg of copper iodide (79 μmol, 0.5 eq.) are then added. The reaction medium is heated at 50° C. for 15 h. After returning to room temperature, the reaction medium is poured into 200 ml of acetone. 55 mg of polymer are recovered in the form of a yellow solid by centrifugation of the acetone.

Hydrolysis of the Polymer

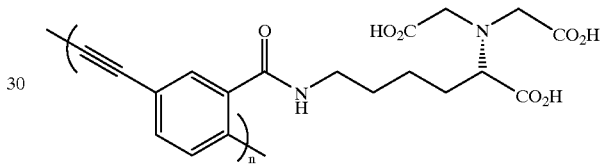

PROCEDURE 50 mg of polymer are suspended in 5 ml of MeOH, and 5 ml of molar potassium hydroxide solution are then added dropwise at 0° C. After stirring for 96 h, the reaction medium is filtered, evaporated and then taken up in the minimum amount of water. The solution obtained is then reacidified by the slow addition of 0.1 M hydrochloric acid solution. The precipitate formed is recovered by centrifugation, washed several times with water and then lyophilized.

Complexation of the Nickel Ions

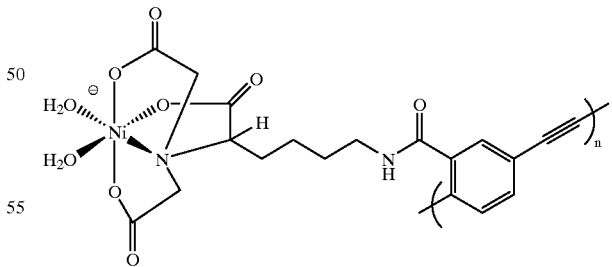

Polymer P0

PROCEDURE 1 mg of polymer is dissolved in 5.15 ml of Tris buffer (10 mM, pH 8). 20 μl of a solution of $NiCl_2.6H_2O$ (500 mM) in Tris (10 mM, pH 8) are then added to 1 ml of the polymer solution. After dialysis, the compound is used in solution without further purification.

EXAMPLE 3

Design of a Library of Molecular Rods Functionalized by Nickel-NTA Complexes (Polymer Ppm) for the Attachment of Histidine-tagged Proteins Synthetic Approach to Controlling the Distance $L_1$ Conditions:

i. TsCl, TEA, THF; ii. NaN$_3$, CH$_3$CN; iii. NaH, BrCH$_2$CO$_2$tBu, THF; iv. TFA, CH$_2$Cl$_2$; v. SOCl$_2$/TEA, CH$_2$Cl$_2$; vi. H$_2$, Pd/C, MeOH.

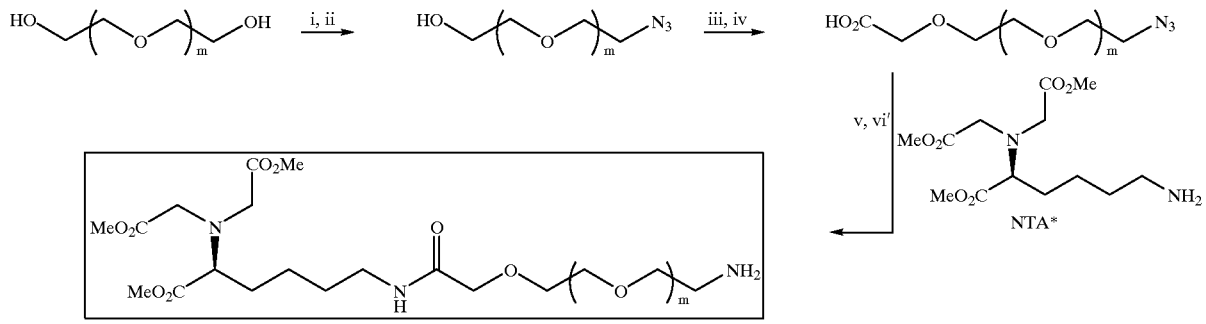

Synthetic Approach to Controlling the Distance $L_2$

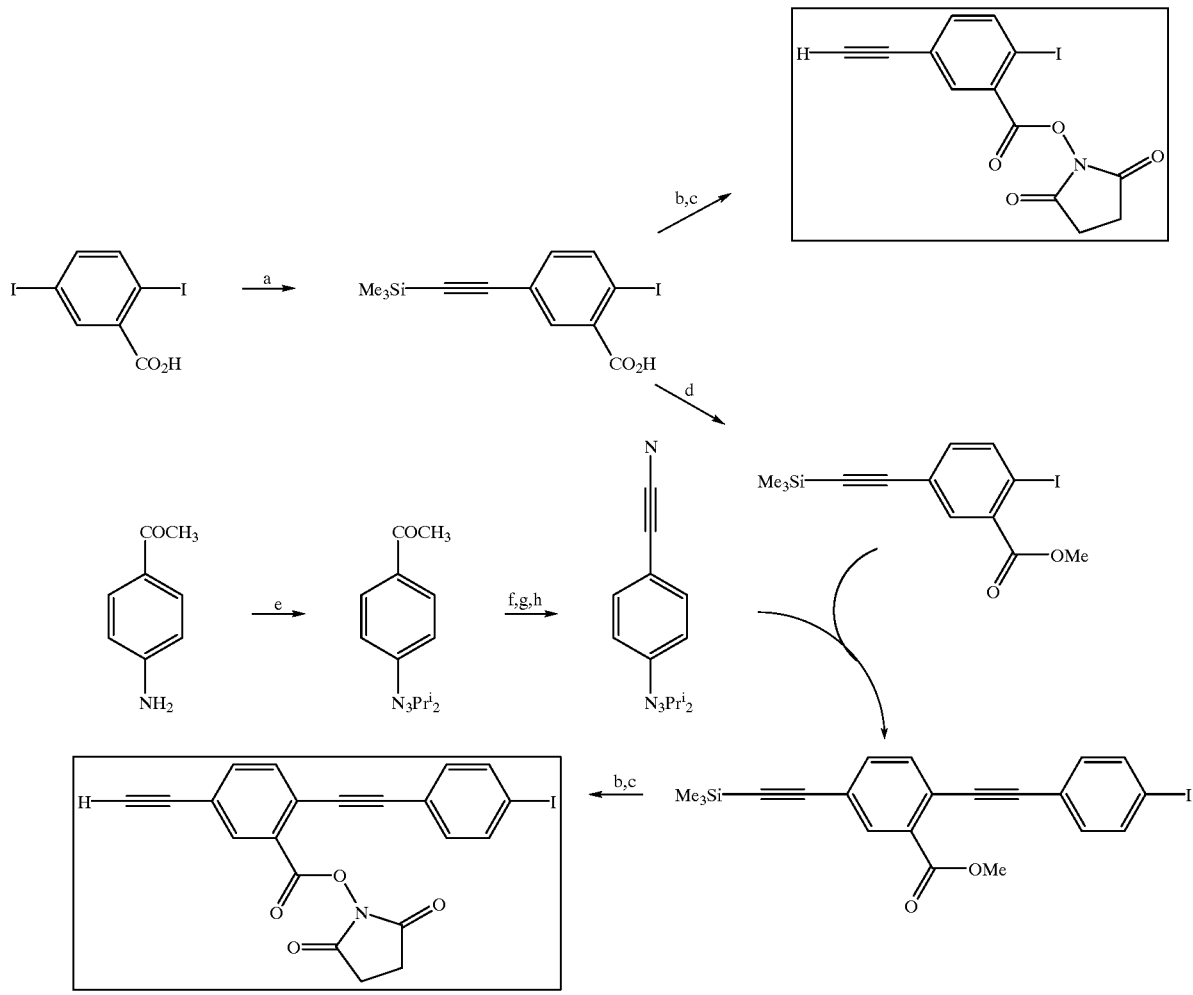

Conditions:
a. TMSA, PdCl$_2$(PPh$_3$)$_2$, CuI, THF/TEA; b. KOH, MeOH; c. NHS, DCC, THF; d. MeOH, EDC, HOBT, THF; e. HCl, NaNO$_2$/K$_2$CO$_3$, HNPr$_2^i$; f. LDA, ClPO(OEt)$_2$; g. LDA (2 eq.), Me$_3$SiCl; h. K$_2$CO$_3$, MeOH; i. PdCl$_2$(PPh$_3$)$_2$, CuI, THF/TEA; j. MeI.

Experimental Protocols

The experimental protocols for polymerization and hydrolysis are identical to those described for the rod P0.

Preparation of the Monomer for the Rod P$_{10}$ 2-(2-Hydroxyethoxy)ethyl Toluene-4-sulfonate

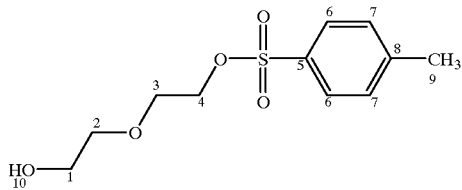

PROCEDURE 50 ml of diethylene glycol (0.5 mol, 10 eq.) and 10 g of tosyl chloride (0.05 mol, 1 eq.) are dissolved in 200 ml of dichloromethane. After the dropwise addition of 7.3 ml of triethylamine (0.05 mol, 1 eq.), the reaction medium is stirred for 16 hours at room temperature. After hydrolysis with 100 ml of water, the reaction medium is extracted twice with 100 ml of dichloromethane and the organic phase is dried over magnesium sulfate, filtered and then evaporated to give a residue, which is purified by flash chromatography on silica 60H (hexane/EtOAc: 40/60). This gives 13.4 g of O-tosyldiethylene glycol in the form of a colourless light oil (yield: 99%/TsCl).

Empirical formula: C$_{11}$H$_{16}$O$_5$S MW: 260.2 g/mol TLC: Rf (hexane/EtOAc: 7/3): 0.32; $^1$H NMR (300 MHz, CDCl$_3$): δ 7.78 (d, J$_{6-7}$=8.1 Hz, 2H, H$_6$); 7.33 (d, J$_{7-6}$=8.1 Hz, 2H, H$_7$); 4.18 (t, J$_{4-3}$=3.2 Hz, 2H, H$_4$); 3.69–3.63 (m, 4H, H$_{2-3}$); 3.51 (t, J$_{1-2}$=3.2 Hz, 2H, H$_1$); 2.43 (s, 3H, H$_9$); 1.98 (bs, 1H, H$_{10}$); $^{13}$C NMR (75.47 MHz, CDCl$_3$): δ 144.70 (1C, C$_8$); 132.82 (1C, C$_5$); 129.60 (2C, C$_6$); 127.69 (2C, C$_7$); 72.24 (1C, C$_2$); 68.91 (1C, C$_3$); 68.35 (1C, C$_4$); 61.40 (1C, C$_1$); 21.33 (1C, C$_9$); MS (70 eV/DCI/NH$_3$/intensity %): m/e: 278 (100, [M+18]$^+$).

2-(2-Azidoethoxy)ethanol 16a

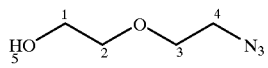

PROCEDURE 12.27 g of 2-(2-hydroxyethoxy)ethyl toluene-4-sulfonate (0.047 mol, 1 eq.) are dissolved in 200 ml of acetonitrile, and 3.67 g of sodium nitride (0.056 mol, 1.2 eq.) are then added. The reaction medium is heated at 80° C. for 16 hours. After hydrolysis with 100 ml of water, the reaction medium is extracted twice with 100 ml of ethyl acetate. The organic phase is dried over magnesium sulfate, filtered and then evaporated to give 3.9 g of a colourless light oil (yield: 63%).

Empirical formula: C$_4$H$_9$O$_2$N$_3$ NM: 131 g/mol TLC: Rf (hexane/EtOAc: 1/1): 0.28; $^1$H NMR (300 MHz, CDCl$_3$): δ 3.72 (t, J$_{2-1}$=4.7 Hz, 2H, H$_2$); 3.66 (t, J$_{3-4}$=4.8 Hz, 2H, H$_3$); 3.58 (t, J$_{1-2}$=4.7 Hz, 2H, H$_1$); 3.38 (t, J$_{4-3}$=4.8 Hz, 2H, H$_4$); 2.32 (bs, 1H, H$_5$); $^{13}$C NMR (75.47 MHz, CDCl$_3$): δ 72.19 (1C, C$_2$); 69.82 (1C, C$_3$); 61.53 (1C, C$_1$)†; 50.49 (1C, C$_4$); MS (70 eV/DCI/NH$_3$/intensity %): m/e: 149 (100, [M+18]$^+$).

t-Butyl [2-(2-azidoethoxy)ethoxy]acetate 19a

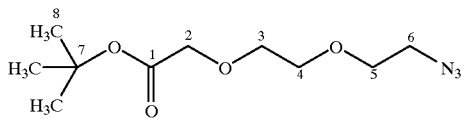

PROCEDURE 1.42 g of sodium hydride (0.035 mol, 1,2 eq.) are suspended in 30 ml of tetrahydrofuran, and a solution of 3.89 g of 16a (0.029 mol, 1 eq.) in 10 ml of tetrahydrofuran is then added dropwise at 0° C. Stirring is maintained at this temperature for half an hour before 8.71 ml of t-butyl bromoacetate (0.059 mol, 2 eq.) are added slowly. The temperature is raised slowly and stirring is maintained overnight. The reaction medium is hydrolyzed with 50 ml of water and then concentrated to give a residue, which is purified by flash chromatography on silica 60H (hexane/EtOAc: 70/30). 3.95 g of product are recovered in the form of a yellowish oil with a yield of 55%.

Empirical formula: C$_{10}$H$_{19}$O$_4$N$_3$ MW: 245 g/mol TLC: Rf (hexane/EtOAc: 7/3): 0.47; $^1$H NMR (300 MHz, CDCl$_3$): δ 4.02 (s, 2H, H$_2$); 3.70–3.66 (m, 6H, H$_{3,4,5}$); 3.39 (t, J$_{6-5}$=5.0 Hz, 2H, H$_6$); 1.46 (s, 9H, H$_8$); $^{13}$C NMR (75.47 MHz, CDCl$_3$): δ 169.37 (1C, C$_1$); 81.33 (1C, C$_7$); 70.55–70.49 (2C, C$_{3\ and\ 4}$); 69.81 (1C, C$_5$); 68.90 (1C, C$_2$); 50.46 (1C, C$_6$); 27.86 (3C, C$_8$); MS (70 eV/DCI/NH$_3$/intensity %): m/e: 207 (15, [M+1]$^+$); 263 (100, [M+18]$^+$).

Methyl 6-(2-[2-(2-azidoethoxy)ethoxy] acetylamino)-2-(bismethoxy-carbonylmethylamino) Hexanoate 20a

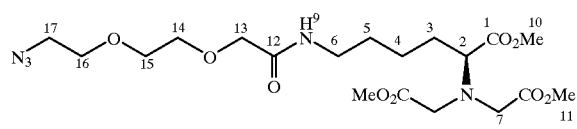

PROCEDURE 3.95 g of 19a (0.016 mol, 1 eq.) are dissolved in 20 ml of dichloromethane, and 10 ml of trifluoroacetic acid are then added dropwise. After stirring for two hours at 60° C., the reaction medium is evaporated to dryness. The residue obtained is then taken up in 4 ml of thionyl chloride and stirred for one hour at room temperature. The medium is evaporated to dryness again, taken up twice in 4 ml of dichloromethane and then re-evaporated. The acid chloride formed is taken up in 10 ml of dichloromethane, and a solution of 6.43 g of polar head NTA* (0.016 mol, 1 eq.) in 10 ml of dichloromethane and 4.46 ml of triethylaitine (0.032 mol, 2 eq.) is then added. The reaction medium is stirred at room temperature overnight and then evaporated to dryness to give a residue, which is purified by flash chro matography on silica 60H (MeOH/CH$_2$Cl$_2$: 3/97). This gives 1.84 g of product in the form of a yellow oil with a yield of 25%.

Empirical formula: C$_{19}$H$_{33}$O$_9$N$_5$ MW: 475 g/mol TLC: Rf (pure EtOAc): 0.34; $^1$H NMR (300 MHz, CDCl$_3$): δ 6.79 (bt, J$_{9-6}$=5.3 Hz, 1H, H$_9$); 3.88 (s, 2H, H$_{13}$); 3.59–3.62 (m, 15H, H$_{10}$, H$_{11}$, H$_{15}$, H$_{15}$, H$_{16}$); 3.54 (s, 4H, H$_7$); 3.29–3.34 (m, 3H, H$_2$, H$_{17}$); 3.18 (dt, J$_{6-5}$=6.5 Hz, J$_{6-9}$=5.3 Hz, 2H, H$_6$); 1.27–1.65 (m, 6H, H$_3$, H$_4$, H$_5$); $^{13}$C NMR (75.47 MHz, CDCl$_3$): δ 172.68 (1C, C$_1$); 171.42 (2C, C$_8$); 169.29 (1C, C$_{12}$); 70.52 (1C, C$_{15}$); 70.20 (1C, C$_{13}$); 69.91 (1C, C$_{14}$); 69.75 (1C, C$_{16}$); 64.35 (1C, C$_2$); 52.10 (2C, C$_7$); 51.27 and 50.30 (2C, C$_{10}$, C$_{11}$); 51.06 (1C, C$_{17}$); 38.30 (1C, C$_6$); 29.74 (1C, C$_3$); 28.94 (1C, C$_5$); 22.93 (1C, C$_4$); MS (70 eV/DCI/NH$_3$/intensity %): m/e: 476 (100, [M+1]$^+$).

Methyl 6-(2-[2-(2-aminoethoxy)ethoxy]acetylamino)-2-(bismethoxy-arbonylmethylamino)hexanoate 21a

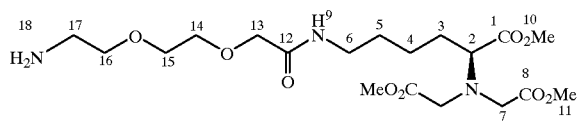

PROCEDURE 1.84 g of 20a (3.88 mmol, 1 eq.) are dissolved in 30 ml of methanol, and 184 mg of palladium-on-charcoal (10% by weight) are then added. The reaction medium is purged three times with hydrogen and then left to stand at room temperature overnight under a hydrogen atmosphere. After the palladium has been filtered off on Célite, the filtrate is evaporated to give 1.70 g (yield: 97%) of a yellow oil, which is used in the subsequent steps without further purification.

Empirical formula: C$_{19}$H$_{35}$O$_9$N$_3$ MW: 449 g/mol TLC: Rf (MeOH/CH$_2$Cl$_2$: 1/9): 0.17; $^1$H NMR (300 MHz, CDCl$_3$): δ 6.92 (bs, 1H, H$_9$); 3.85 (s, 2H, H$_{13}$); 3.55–3.13 (m, 26H, H$_2$, H6, H$_7$, H$_{10}$, H$_{11}$, H$_{13}$, H$_{14}$, H$_{15}$, H$_{16}$, H$_{17}$); 1.24–1.62 (m, 6H, H$_3$, H$_4$, H$_5$); MS (70 eV/DCI/NH$_3$/intensity %): m/e: 450 (100, [M+1]$^+$).

Methyl 2-(bismethoxycarbonylmethylamino)-6-(2-[2-(2-(5-ethynyl-2-iodobenzoylamino)ethoxy)ethoxy]acetylamino)hexanoate 22a

PROCEDURE

A solution of 150 mg of 2,5-dioxopyrrolidin-1-yl 2-iodo-5-ethynylbenzoate (0.33 mmol, 1 eq.) in 5 ml of CH$_2$Cl$_2$ and 0.2 ml of triethylamine is run into a solution of 123 mg of 21a (0.33 mmol, 1 eq.) in 2 ml of CH$_2$Cl$_2$. The reaction medium is stirred at room temperature for 24 h and then evaporated. The residue is chromatographed on silica gel 60H (MeOH/CH$_2$Cl$_2$: 3/97) to give 145 mg of a yellowish oil with a yield of 62%.

Empirical formula: C$_{28}$H$_{38}$O$_{10}$N$_3$I MW: 703 g/mol TLC: Rf (MeOH/CH$_2$Cl$_2$: 1/9): 0.50; $^1$H NMR (300 MHz, CDCl$_3$): δ 7.79 (d, J$_{23-25}$=8.1 Hz, 1H, H$_{23}$); 7.45 (d, J$_{25-23}$=1.5 Hz, 1H, H$_{25}$); 7.15 (dd, J$_{23-25}$=1.5 Hz and J$_{23-22}$=8.1 Hz, 1H, H$_{23}$); 6.76 (bt, 1H, H$_9$); 6.50 (bt, 1H, H$_{18}$); 4.11 (s, 2H, H$_{13}$); 3.58–3.96 (m, 17H, H$_{10}$, H$_{11}$, H$_{14}$, H$_{15}$, H$_{16}$); 3.51 (s, 4H, H$_7$); 3.20–3.41 (m, 5H, H$_2$, H$_6$, H$_{17}$); 3.17 (s, 1H, H$_{28}$); 1.44–1.71 (m, 6H, H$_3$, H$_4$, H$_5$); $^{13}$C NMR (75.47 MHz, CDCl$_3$): δ 172.75 (1C, C$_{19}$); 171.64 (1C, C$_1$); 171.49 (1C, C$_8$); 169.38 (1C, C$_{12}$); 142.14 (1C, C$_{20}$); 139.69 (1C, C$_{25}$); 133.86 (1C, C$_{22}$); 131.21 (1C, C$_{23}$); 122.25 (1C, C$_{24}$); 115.97 (1C, C$_{21}$); 92.71 (1C, C$_{26}$); 79.45 (1C, C$_{27}$); 70.65 (1C, C$_{15}$); 70.36 (1C, C$_{13}$); 69.87 (1C, C$_{14}$); 69.41 (1C, C$_{16}$); 64.36 (1C, C$_2$); 52.39; 51.16 (2C, C$_7$); 52.16; 51.37 (3C, C$_{10}$, C$_{11}$); 39.46 (1C, C$_{17}$); 39.37 (1C, C$_6$); 29.77 (1C, C$_3$); 28.95 (1C, C$_5$); 22.98 (1C, C$_4$); MS (70 eV/DCI/NH$_3$/intensity %): m/e: 704 (100, [M+1]$^+$); 721 (36, [M+18]$^+$). Microanalysis for C$_{28}$H$_{38}$N$_3$O$_{10}$I: Calc.: C, 47.80; H, 5.44; N, 5.97; O, 22.74; I, 18.03 Exp.: C, 47.75; H, 5.71; N, 5.72.

Preparation of the Monomer for the Rod P$_{21}$

Methyl 6-(2-(2-[2-(2-aminoethoxy)ethoxy]ethoxy)acetylamino)-2-(bis-methoxycarbonylmethylamino)hexanoate 21b

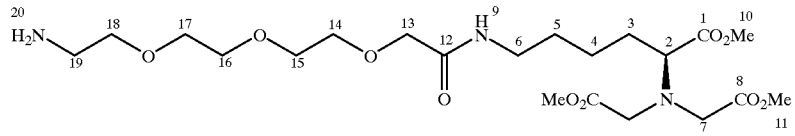

PROCEDURE

The protocol is identical to that used for the preparation of the product 21a, the synthesis being started from triethylene glycol.

Empirical formula: C$_{21}$H$_{39}$O$_{10}$N$_3$ MW: 493 g/mol TLC: Rf (MeOHCH$_2$Cl$_2$/TEA: 1/9/0.1): 0.27; $^1$H NMR (300 MHz, CD$_3$OD): δ 4.59 (bs, 3H, H$_9$, H$_{20}$); 3.94 (s, 2H, H$_{13}$); 3.10–3.61 (m, 28H, H$_2$, H$_6$, H$_7$, H$_{10}$, H$_{11}$, H$_{14}$, H$_{15}$, H$_{16}$, H$_{17}$, H$_{18}$, H$_{19}$); 1.19–1.62 (m, 6H, H$_3$, H$_4$, H$_5$); MS (70 eV/DCI/NH$_3$/intensity %): m/e: 494 (100, [M+1]$^+$).

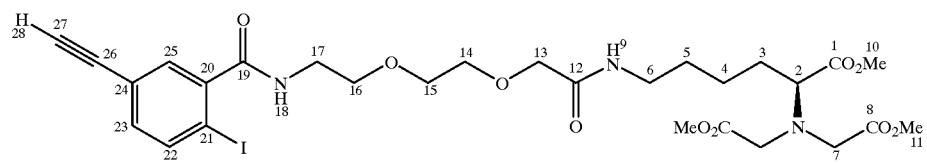

4-(Diisopropyltriazenyl)acetophenone 25

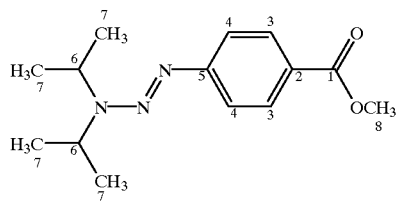

PROCEDURE 1 g (7.4 mmol) of 4-aminoacetophenone is dissolved in a mixture consisting of 30 ml of water and 5 ml of concentrated hydrochloric acid. The reaction medium is cooled to 0° C. and a solution of 520 mg (7.54 mmol, 1.02 eq.) of sodium nitrite in 1 ml of water is then added. After stirring for 30 min, the reaction medium is added cautiously to a solution, at 0° C., composed of 8 g of potassium carbonate and 8.17 ml (5.82 mmol, 7.8 eq.) of diisopropylamine in 50 ml of water. Stirring is maintained at this temperature for 30 min, the reaction medium is then hydrolyzed with 50 ml of water and the aqueous phase is extracted four times with 50 ml of ethyl ether. The organic phase is dried over magnesium sulfate, filtered and then evaporated to give a residue, which is chromatographed on silica gel 60H (AcOEt/hexane: 2/8) to give 1.18 g of a yellow powder with a yield of 64%.

Empirical formula: $C_{14}H_{21}N_3O_2$ MW: 247.33 g/mol TLC: Rf (hexane/EtOAc: 9/1): 0.40; $^1$H NMR (300 MHz, CDCl$_3$): δ 7.92 (d, $J_{3-4}$=8.6 Hz, 2H, H$_3$); 7.44 (d, $J_{4-3}$=8.6 Hz, 2H, H$_4$); 5.33 (bs, 1H, H$_6$); 4.03 (bs, 1H, H$_6$); 2.57 (s, 3H, H$_3$); 1.37 (bd, 6H, H$_7$); 1.24 (bd, 6H, H$_7$); $^{13}$C NMR (75.47 Mz, CDCl$_3$): δ 197.17 (1C, C$_1$); 155.32 (1C, C$_5$); 133.11 (1C, C$_2$); 129.30 (2C, C$_3$); 119.82 (2C, C$_4$); 49.17 (1C, C$_6$); 46.17 (1C, C$_6$); 26.23 (1C, C$_8$); 23.63, 19.11 (4C, C$_7$); MS (70 eV/DCI/NH3/intensity %): m/e: 248 (100, [M+1]$^+$).

1-(Diisopropyltriazenyl)-4-((trimethylsilyl)ethynyl)benzene 26

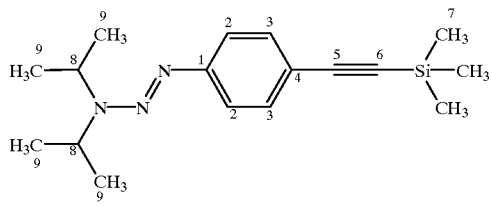

PROCEDURE

A solution of 8.62 g (34.9 mmol, 1 eq.) of 4-(diisopropyltriazenyl)aceto-phenone in 30 ml of THF is added dropwise at −78° C. to 1.03 eq. of LDA, the latter being formed at 0° C. from 5.17 ml of diisopropylamine (36.9 mmol, 1.06 eq.) and 22.4 ml of 1.6 M BuLi in hexane (35.9 mmol, 1.03 eq.) in 38.5 ml of THF. The reaction medium is stirred at −78° C. for one hour, 5.04 ml of diethyl chlorophosphate (34.9 mmol, 1 eq.) are then added dropwise and the mixture is heated to room temperature. After stirring for 3 hours, this solution is added to 2.25 eq. of LDA, the latter being formed at 0° C. from 11 ml of diisopropylamine (78.5 mmol, 2.25 eq.) and 49 ml of 1.6 M BuLi in hexane (78.5 mmol, 2.25 eq.) in 80 ml of THF. The reaction medium is left to stand overnight, during which the temperature rises slowly. The round-bottom flask is cooled to 0° C., 4.86 ml of trimethylsilyl chloride (38.3 mmol, 1.1 eq.) are added, stirring is maintained for 15 min and the mixture is then hydrolyzed with 100 ml of water. The aqueous phase is extracted three times with 100 ml of ethyl ether, after which the organic phase is dried over magnesium sulfate, filtered and then evaporated. The residue obtained is purified by flash chromatography on silica gel 60H (pure hexane) to give 6.08 g of 1-(diisopropyltriazenyl)-4-((trimethylsilyl)ethynyl)benzene with a yield of 58%.

Empirical formula: $C_{17}H_{27}N_3Si$ MW: 301 g/mol TLC: Rf (hexane): 0.30; $^1$H NMR (300 MHz, CDCl$_3$): δ 7.40 (d, $J_{2-3}$=8.5 Hz, 2H, H$_2$); 7.32 (d, $J_{3-2}$=8.5 Hz, 2H, H$_3$); 5.33 (bs, 1H, H$_8$); 4.03 (bs, 1H, H$_8$); 1.29 (bs, 12H, H$_9$); 0.24 (s, 9H, H$_7$); $^{13}$C NMR (75A7 MHz, CDCl$_3$): δ 151.45 (1C, C$_1$); 132.42 (2C, C$_2$); 119.82 (2C, C$_3$); 118.66 (1C, C$_4$); 105.72 (1C, C$_6$); 93.05 (1C, C$_5$); 48.13, 46.17 (2C, C$_8$); 23.80, 19.11 (4C, C$_9$); −0.15 (3C, C$_7$); MS (70 eV/DCI/NH$_3$/intensity %): m/e: 302 (100, [M+1]$^+$);

1-(Diisopropyltriazenyl)-4-ethynylbenzene 27

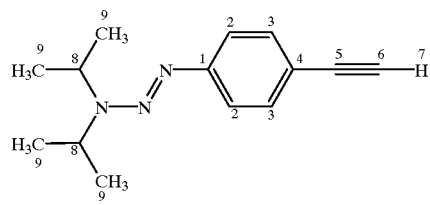

PROCEDURE 6 g of 1-(diisopropyltriazenyl)-4-((trimethylsilyl)ethynyl)benzene (19.9 mmol, 1 eq.) are dissolved in 100 ml of MeOH, and 13.7 g of K$_2$CO$_3$ (99.5 mmol, 5 eq.) are added in small portions. The reaction medium is stirred at room temperature for 15 h and then evaporated to dryness and taken up in 100 ml of water and 100 ml of EtOAc. The aqueous phase is extracted four times with 50 ml of EtOAc, after which the organic phase is dried over magnesium sulfate, filtered and then evaporated to give 4.38 g of 1-(diisopropyltriazenyl)-4-ethynylbenzene with a yield of 96%.

Empirical formula: $C_{14}H_{19}N_3$ MW: 229 g/mol TLC: Rf (pure hexane): 0.30; $^1$H NMR (300 MHz, CDCl$_3$): δ 7.46 (d, $J_{2-3}$=8.6 Hz, 2H, H$_2$); 7.37 (d, $J_{3-2}$=8.6 Hz, 2H, H$_3$); 5.33 (bs, 1H, H$_8$); 4.03 (bs, 1H, H$_8$); 3.06 (s, 1H, H$_7$); 1.29 (bs, 12H, H$_9$); $^{13}$C NMR (75.47 MHz, CDCl$_3$): δ 151.75 (1C, C$_1$); 132.57 (2C, C$_2$); 119.95 (2C, C$_3$); 117.56 (1C, C$_4$); 84.14 (1C, C$_5$); 76.28 (1C, C$_6$); 48.68, 45.75 (2C, C$_8$); 23.61, 19.28 (4C, C$_9$); MS (70 eV/DCI/NH$_3$/intensity %): m/e: 230 (100, [M+1]$^+$).

Methyl 2-Iodo-4-trimethylsilylethynylbenzoate 28

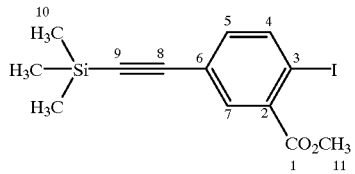

PROCEDURE 2.6 g of 2-iodo-5-((trimethylsilyl)ethynyl)benzoic acid (7.56 mmol, 1 eq.) are dissolved in 50 ml of THF, 2.17 g of N-ethyl-N'-(3-dimethylaminopropyl)-carbodiimide (EDC) (11.3 mmol, 1.5 eq.) and 1.52 g of hydroxybenzotriazole (HOBT) (11.3 mmol, 1.5 eq.) are then added and 18 ml of MeOH are finally added dropwise. The reaction medium is stirred at room temperature for 4 h and then evaporated to dryness and taken up in 50 ml of water and 50 ml of EtOAc. The organic phase is washed with 25 ml of 5% aqueous KHS04 solution, 25 ml of 5% aqueous NaHCO$_3$ solution and 25 ml of saturated aqueous NaCl solution. It is subsequently dried over magnesium sulfate, filtered and then evaporated to give 2.93 g of a yellow oil (yield: quantitative), which is used in the subsequent steps without further purification.

Empirical formula: C$_{13}$H$_{15}$O$_2$ISi MW: 357.9 g/mol TLC: Rf (Hexane/EtOAc: 9/1): 0.46; $^1$H NMR (300 MHz, CDCl$_3$): δ 7.91 (d, J$_{4-6}$=8.0 Hz, 1H, H$_4$); 7.87 (d, J$_{7-6}$=2.1 Hz, 1H, H$_7$); 7.18 (dd, J$_{6-7}$=2.1 Hz, J$_{6-4}$=8.0 Hz, 1H, H$_6$); 3.91 (s, 3H, H$_{11}$); 0.23 (s, 9H, H$_{10}$); $^{13}$C NMR (75.47 MHz, CDCl$_3$): δ 165.86 (1C, C$_1$); 141.05 (1C, C$_4$); 134.99; 133.90 (2C, C$_6$, C$_7$); 134.78 (1C, C$_2$); 123.10 (1C, C$_5$); 102.61 (1C, C$_3$); 96.60 (1C, C$_9$); 93.83 (1C, C$_8$); 52.31 (1C, C$_{11}$); −0.44 (3C, C$_{10}$); MS (70 eV/DCI/NH$_3$/intensity %): m/e: 376 (100, [M+18]$^+$).

Methyl 2-(4-diisopropyltriazenylphenylethynyl)-5-trimethylsilyl-ethynylbenzoate 29

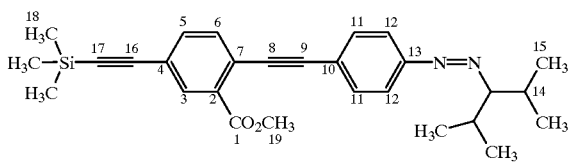

PROCEDURE 676 mg of 27 (1.88 mmol, 1 eq.) are dissolved in 7 ml of THF, and 132 mg of Pd (0.18 mmol, 0.01 eq.) and 132 mg of copper iodide (3.76 mmol, 0.02 eq.) are then added. The reaction medium is stirred for 15 min and a solution of 430 mg of 28 (1.88 mmol, 1 eq.) in 7 ml of THF is then added dropwise. Stirring is maintained for 15 h at room temperature. After evaporation to dryness, the residue is purified on silica gel 60H (hexane/EtOAc: 97/3) to give 683 mg of a lemon-yellow powder with a yield of 79%.

Empirical formula: C$_{27}$H$_{33}$N$_3$O$_2$Si MW: 459 g/mol TLC: Rf (hexane/EtOAc: 9/1): 0.28; $^1$H NMR (300 MHz, CDCl$_3$): δ 8.06 (s, 1H, H$_3$); 7.34–7.57 (m, 6H, H$_5$, H$_6$, H$_{11}$, H$_{12}$); 5.27 (bs, 1H, H$_{14}$); 3.96 (s, 4H, H$_{14}$, H$_{19}$); 1.31 (s, 12H, H$_{15}$); 0.25 (s, 9H, H$_{18}$); $^{13}$C NMR (75.47 MHz, CDCl$_3$): δ 165.84 (1C, C$_1$); 151.78 (1C, C$_{13}$); 134.28; 133.85; 133.45; 132.99 (4C, C$_3$, C$_5$, C$_6$); 132.99 (2C, C$_{11}$); 131.36 (1C, C$_2$); 123.80; 122.16 (2C, C$_7$, C$_{10}$); 102.08 (2C, C$_{12}$); 118.54 (1C, C$_4$); 103.47 (1C, C$_{17}$); 97.21, 96.83 (2C, C$_8$, C$_9$); 87.69 (1C, C$_{16}$); 52.02 (1C, C$_{19}$); 48.88, 45.97 (2C, C$_{14}$); 23.72, 19.16 (4C, C$_{15}$); −0.36 (3C, C$_{18}$). MS (70 eV/DCI/NH$_3$/intensity %): m/e: 460 (100, [M+1]$^+$).

Methyl 2-(4-iodophenylethynyl)-5-trimethylsilylethynylbenzoate

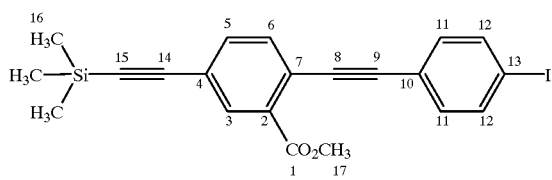

PROCEDURE 2.3 g of 29 (5 mmol, 1 eq.) in 5 ml of methyl iodide (90 mmol, 18 eq.) are placed in a sealed tube. The reaction medium is heated at 120° C. for 72 h and then evaporated to dryness. The residue is taken up in 20 ml of ethyl ether, filtered and then evaporated to give 2.2 g of a yellow oil with a yield of 96%.

Empirical formula: C$_{21}$H19O$_2$SiI MW: 458 g/mol TLC: Rf (hexane/EtOAc 9/1): 0.38; $^1$H NMR (300 MHz, CDCl$_3$): δ 8.06 (s, 1H, H$_3$); 7.68 (d, J$_{11-12}$=8.0 Hz, 2H, H$_{12}$); 7.54 (s, 2H, H$_3$, H$_5$); 7.26 (d, J$_{11-12}$=8.0 Hz, 2H, H$_{11}$); 3.93 (s, 3H, H$_{17}$); 0.25 (s, 9H, H$_{16}$); $^{13}$C NMR (75.47 MHz, CDCl$_3$): δ 165.51 (1C, C$_1$); 137.36 (2C, C$_{12}$); 134.40; 133.87; 133.59 (3C, C$_3$, C$_5$, C$_6$); 132.97 (2C, C$_{11}$); 131.54 (1C, C$_2$); 122.95 (2C, C$_7$, C$_{10}$); 122.38 (1C, C$_4$); 103.21 (1C, C$_{15}$); 97.35, 94.96 (2C, C$_8$, C$_9$); 89.19 (13C, C$_{14}$); 94.54 (1C, C$_{13}$); 52.08 (1C, C$_{17}$); −0.40 (3C, C$_{16}$); MS (70 eV/DCI/NH$_3$intensity %): m/e: 459 (59, [M+1]$^+$); 476 (100, [M+18]$^+$).

2,5-Dioxopyrrolidin-1-yl 5-ethynyl-2-(4-iodophenylethynyl)benzoate 30

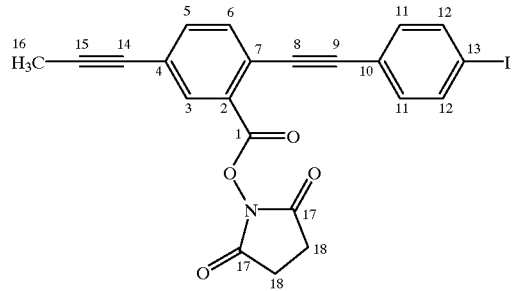

PROCEDURE 500 mg of methyl 2-(4-iodophenylethynyl)-5-trimethylsilylethynylbenzoate are treated with base in methanol; 68 mg of the 5-ethynyl-2-(4-iodophenylethynyl)-benzoic acid (0.18 mmol, 1 eq.) are dissolved in 3 ml of THF, and 25 mg of N-hydroxysuccinimide (0.22 mmol, 1.2 eq.) and 13 mg of dimethylaminopyridine (0.10 mmol, 0.55 eq.) are then added. The reaction medium is cooled to 0° C. and a solution of 45 mg of dicyclohexylcarbodiimide (0.22 mmol, 1.2 eq.) in 1 ml of CH$_2$Cl$_2$ is then added dropwise. Stirring is maintained for 15 h, the temperature being allowed to rise slowly. The reaction medium is subsequently filtered and then evaporated to give a residue, which is purified by chromatography on silica gel. The resulting product is washed once with EtOAc to give 50 mg of a pale yellow solid with a yield of 60%.

Empirical formula: C$_{21}$H$_{12}$O$_4$NI MW: 469 g/mol TLC: Rf (hexane/EtOAc: 60/40): 0.5; $^1$H NMR (300 MHz, CD$_3$OD): δ 8.03 (s, 1H, H$_3$); 7.44–7.50 (m, 4H, H$_5$, H$_6$, H$_{12}$); 7.06 (d, J$_{11-12}$=8.2 Hz, 2H, H$_{11}$); 3.22 (s, 1H, H$_{16}$); 2.74 (s, 4H, H$_{18}$); MS (70 eV/DCI/NH$_3$/intensity %): m/e: 470 (9.8, [M+1]$^+$); 477 (100, [M+18]$^+$);

Methyl 2-(Bismethoxycarbonylmethylamino)-6-(2-[2-(2-(2-[5-ethynyl-2-(4-iodophenylethynyl)benzoylamino]ethoxy)ethoxy)ethoxy]acetylamino)-hexanoate 31b

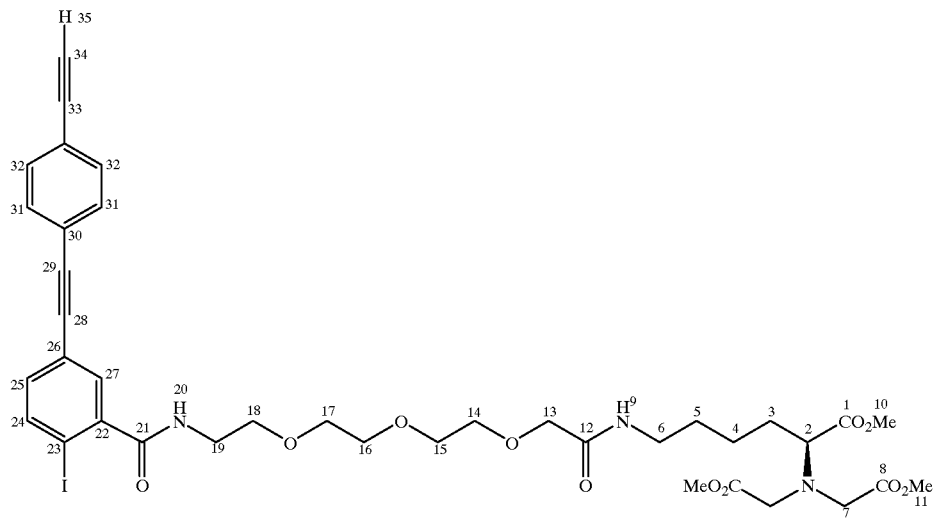

PROCEDURE

A solution of 92 mg of 30 (0.18 mmol, 1 eq.) in 3 ml of $CH_2Cl_2$ and 0.25 ml of triethylamine (1.8 mmol, 10 eq.) is added dropwise to a solution of 88 mg of 21b (0.18 mmol, 1 eq.) in 2 ml of $CH_2Cl_2$. The reaction medium is stirred at room temperature for 4 h and then evaporated to dryness. The residue obtained is chromatographed on silica gel 60H ($CH_2Cl_2$/MeOH: 97/3) to give 60 mg of a yellowish oil with a yield of 40%.

Empirical formula: $C_{38}H_{46}O_{11}N_3I$ MW: 847 g/mol TLC: Rf (MeOH/$CH_2Cl_2$: 1/9): 0.47; $^1$H NMR (300 MHz, $CDCl_3$): δ 8.00 (s, 1H, $H_{27}$); 7.70 (d, $J_{32-31}$=8.2 Hz, 2H, $H_{32}$); 7.50 (bs, 3H, $H_{24}$, $H_{25}$, $H_{20}$); 7.26 (d, $J_{31-32}$=8.2 Hz, 2H, $H_{31}$); 6.61 (bt, 1H, $H_9$); 3.88 (s, 2H, $H_{13}$); 3.16–3.70 (m, 25H, $H_7$, $H_{10}$, $H_{11}$, $H_{14}$, $H_{15}$, $H_{16}$, $H_{17}$, $H_{18}$, $H_{19}$); 3.16–3.25 (m, 4H, $H_2$, $H_6$, $H_{35}$); 1.41–1.69 (m, 6H, $H_3$, $H_4$, $H_5$); MS (70 eV/DCI/$NH_3$/intensity %): m/e: 848 (7, $[M+1]^+$). Microanalysis for $C_{30}H_{42}N_3O_{11}I$: Calc.: C, 53.84; H, 5.46; N, 4.95; O, 20.76; I, 14.97 Exp.: C, 52.62; H, 5.84; N, 4.98.

EXAMPLE 4

Attachment of His-tag Proteins to a Molecular Rod Functionalized by an Ni—NTA Complex The attachment of the ABC23-(His)$_6$ subunit of yeast RNA polymerases to the polymer P0 functionalized by nickel-NTA complexes was studied. A study by permeation chromatography made it possible to demonstrate the specific attachment of "histidine-tagged" proteins to the polymer. In fact, the elution of the protein is accelerated in the presence of polymer. Several proteins attach themselves to the polymer to form higher-molecular protein complexes. Furthermore, this attachment is induced by an interaction between the nickel and the polyhistidine tag because the untagged ABC23 protein seems to show little or no attachment to the polymer P0.

Protocol:

2 5 µl of a 500 µM solution of molecular rod P0 in Tris buffer (10 mM, pH 8) are added either to 5 µl of a solution of ABC23-His$_6$ protein (3.2 mg/ml in 10 mM Tris buffer, 150 mM NaCl), or to 7 µl of a solution of ABC23 protein (2.3 mg/ml in 10 mM Tris buffer, 150 mM NaCl), or to 5 µl of Tris buffer (10 mM, pH 8). After 18 h without stirring, the volume of the solution is made up to 50 µl by the addition of Tris buffer (10 mM, pH 8) and the whole mixture is injected into a 50 µl injection loop of a Smart® system.

Conditions:

Study of the attachment of the ABC23-(His)$_6$ of yeast RNA polymerase to the polymer P0 by permeation chromatography using a Smart® system (Superose 6 column; elution with Tris (10 mM, pH 8; 150 mM NaCl))

EXAMPLE 5

Electron Microscopic Observation of His-tag Proteins on a Molecular Rod Functionalized by an Ni—NTA Complex The attachment of a phosphatase-(His)$_6$ to the polymer P0 functionalized by nickel-NTA complexes was studied by permeation chromatography. The structure of the supramolecular objects formed is observed by electron microscopy. The formation of linear aggregates of proteins is noted.

Experimental Conditions

After purification by permeation chromatography on a Smart® system (Superose 6 column; elution with Tris (10 mM, pH 8; 150 mM NaCl)), 5 µl of solution are deposited on an electron microscope grid which is coated with a carbon film and has been discharged beforehand with a current of 20 mA under vacuum. The grid is then negatively stained with uranyl acetate solution and observed under the electron microscope.

Photographs are recorded on KODAK SO163 films at a magnification of 45,000×with a Philips CM120 transmission electron microscope operating at 100 kV under minimal electron beam conditions (<10 electrons/Å$^2$).

As is apparent from the foregoing description, the invention is in no way limited to those modes of execution, embodiments and modes of application which have now been described more explicitly; on the contrary, it encompasses all the variants thereof which may occur to those skilled in the art, without deviating from the framework or the scope of the present invention.

What is claimed is:

1. A molecular rod comprising a structure represented by general formula I:

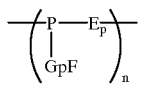

wherein:
P is a polyphenylene, polyphenylenevinylene, polyphenyleneethynylene or polyvinylene polymer comprising at least one of the following structures:

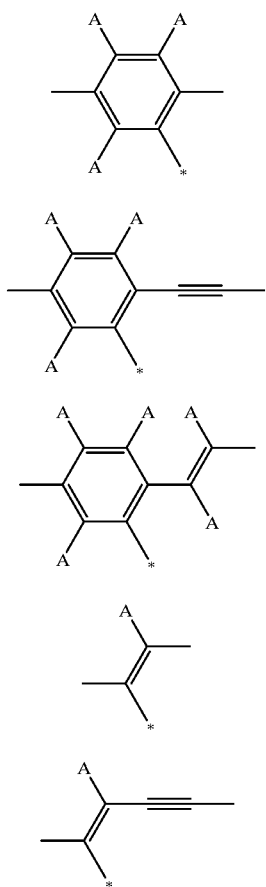

wherein * indicates a bond to GpF and A is selected from the group consisting of a hydrogen atom, alkyl, OH, O-alkyl, $NH_2$, NH-alkyl, $CO_2H$, $CO_2$-alkyl, $CONH_2$, and CONH-alkyl;

GpF comprises elements B and R, in which:
B is a group comprising a saturated or unsaturated aliphatic $C_1$–$C_{10}$ hydrocarbon, a saturated or unsaturated aliphatic $C_1$–$C_{10}$ hydrocarbon that is substituted by an alkyl group, a polyoxyethylene unit, or a polyoxyethylene unit that has an internal phosphate group and R is selected from the group consisting of a positively- or negatively-charged hydrophilic group, a ligand or an analogue of a biological macromolecule, and an organometallic complex that interacts with an amino acid or a nucleic acid, E is a phenylene, ethynylene or vinylene unit or a combination of these units, p is an integer between 0 and 10 and
n is an integer between 5 and 1000.

2. The molecular rod of claim 1 comprising formula II:

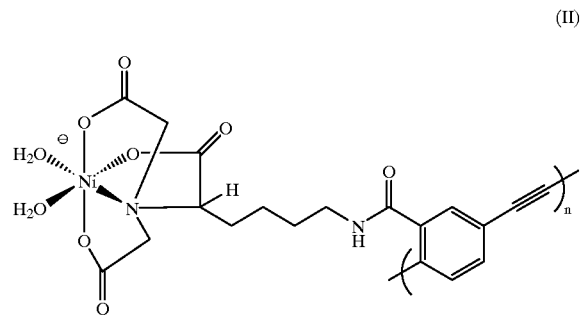

wherein n is an integer between 5 and 1000.

3. The molecular rod of claim 1 comprising formula III:

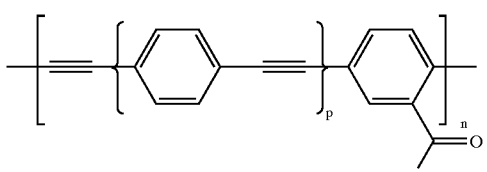

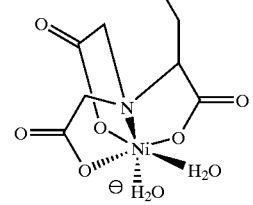

wherein:
m is an integer between 1 and 10;
p is an integer between 0 and 10; and
n is an integer between 5 and 1000.

4. A method for the attachment and/or auto-organization of biological macromolecules comprising:
incubating a biological macromolecule in solution with a molecular rod of claim 1 for a time and under conditions suitable for attachment or auto-organization of said biological macromolecules on said molecular rod.

5. The method of claim 4, wherein said biological macromolecules are soluble membrane or trans-membrane proteins, enzymes, antibodies, antibody fragments or nucleic acids.

6. The method of claim 4, wherein said solution consists of an aqueous or aqueous-alcoholic solvent for solubilizing said biological macromolecules, optionally containing at least one detergent.

7. The method according to claim 4, wherein incubation occurs at room temperature for 15 minutes to 48 hours at a pH of between 5.5 and 8.5.

8. A supramolecular object comprising a molecular rod of claim 1.

9. A supramolecular object comprising the molecular rod of claim 1 on which at least one biological macromolecule is organized in a crystalline form, or to which at least one biological macromolecule is noncovalently attached.

10. A method for the structural study of a macromolecule comprising:
organizing, arranging or crystalizing a biological macromolecule on a molecular rod of claim 1 for a time and under conditions suitable for formation of a supramolecular object and
determining the structure of said supramolecular object.

11. A method of detecting a biological substance comprising contacting the supramolecular object of claim 9 with a sample suspected of containing a molecule that binds to said biological macromolecules for a time and under conditions suitable for binding.

12. The method of claim 11, wherein said supramolecular object is a biosensor or bioconductor.

13. The molecular rod of claim 1, wherein B is selected from the group consisting of:

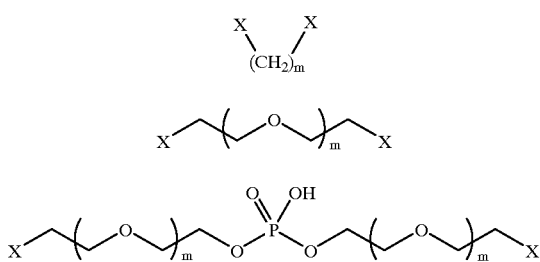

wherein:
m is an integer from 1 to 10, and
X is O, NHCO, OCO, COO, CONH, S, $CH_2$ or NH and constitutes at the ends of said groups, an organic coupling group of the ester, amide, ether or thioether type.

14. The molecular rod of claim 1, wherein E is a unit of the formula:

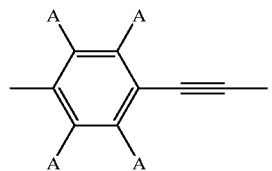

in which A is hydrogen, alkyl, OH, O-alkyl, $NH_2$, NH-alkyl, $CO_2H$, $CO_2$-alkyl, $CONH_2$, or CONH-alkyl.

15. The molecular rod of claim 1, wherein B comprises at least one group X, wherein X is an organic coupling group of the ester, amide, ether or thioether type.

16. The molecular rod of claim 15, wherein X is selected from the group consisting of O, NHCO, OCO, COO, CONH, S, $CH_2$ and NH.

17. A biological or immunological reagent comprising the molecular rod of claim 1.

18. A biosensor or bioconductor comprising the molecular rod of claim 1.

19. A biomaterial comprising the molecular rod of claim 1.

20. A nanomaterial comprising the molecular rod of claim 1.

21. The molecular rod of claim 1, wherein R comprises biotin, novobiocin, retinoic acid, or a steroid.

22. The molecular rod of claim 1, wherein R comprises an antigen.

23. The molecular rod of claim 1, wherein R comprises an organometallic complex comprising copper, zinc, nickel, cobalt, chromium, platinum, palladium, iron, ruthernium, or osmium.

24. The molecular rod of claim 1, wherein R comprises an organometallic complex comprising IDA, NTA, EDTA, bipyridine or terpyridine.

25. The supramolecular object of claim 9, wherein said biological molecule is a soluble protein, a transmembrane protein, or a membrane protein.

26. The supramolecular object of claim 9, wherein said biological molecule is a histidine-tagged protein.

27. The supramolecular object of claim 9, wherein said biological molecule is an enzyme.

28. The supramolecular object of claim 9, wherein said biological molecule is a nucleic acid.

29. The supramolecular object of claim 9, wherein said biological molecule is an antibody or an antibody fragment.

30. A library of molecular rods comprising the molecular rod of claim 1.

* * * * *

UNITED STATES PATENT AND TRADEMARK OFFICE
CERTIFICATE OF CORRECTION

PATENT NO. : 6,403,705 B1
DATED : June 11, 2002
INVENTOR(S) : Balavoine et al.

It is certified that error appears in the above-identified patent and that said Letters Patent is hereby corrected as shown below:

<u>Title page,</u>
Item [86], should read:

-- [86] PCT No.: PCT/FR99/01207

§ 371 (c)(1),
(2), (4)Date: Jan. 4, 2001 --

Signed and Sealed this

Fifteenth Day of April, 2003

JAMES E. ROGAN
*Director of the United States Patent and Trademark Office*